US012805524B2

(12) United States Patent
Howard

(10) Patent No.: US 12,805,524 B2
(45) Date of Patent: Nov. 24, 2026

(54) METHOD OF USING SIMAZINE FOR CONTROLLING ANNUAL BLUEGRASS IN COOL SEASON-TURFGRASSES

(71) Applicant: Harold F. Howard, Phoenix, AZ (US)

(72) Inventor: Harold F. Howard, Phoenix, AZ (US)

( * ) Notice: Subject to any disclaimer, the term of this patent is extended or adjusted under 35 U.S.C. 154(b) by 0 days.

(21) Appl. No.: 18/613,069

(22) Filed: Mar. 21, 2024

(65) Prior Publication Data

US 2024/0315246 A1 Sep. 26, 2024

Related U.S. Application Data

(60) Provisional application No. 63/454,046, filed on Mar. 22, 2023.

(51) Int. Cl.

*A01N 43/70* (2006.01)
*A01N 43/90* (2006.01)
*A01P 13/02* (2006.01)
*A01P 21/00* (2006.01)

(52) U.S. Cl.

CPC ............. *A01N 43/70* (2013.01); *A01N 43/90* (2013.01); *A01P 13/02* (2021.08); *A01P 21/00* (2021.08)

(58) Field of Classification Search

CPC ......... A01N 43/70; A01N 43/90; A01P 21/00; A01P 13/02

See application file for complete search history.

(56) References Cited

U.S. PATENT DOCUMENTS

| | | | |
|---|---|---|---|
| 8,426,342 B2 | 4/2013 | Kilian | |
| 9,029,294 B2 | 5/2015 | Loughner | |
| 2011/0028324 A1 | 2/2011 | Cordingley | |
| 2011/0190134 A1 | 8/2011 | Jousseaume | |
| 2016/0000074 A1 | 1/2016 | Young | |
| 2020/0146290 A1* | 5/2020 | Prudhomme | A01N 47/36 |

FOREIGN PATENT DOCUMENTS

| | | | |
|---|---|---|---|
| WO | WO-2013037955 A1 * | 3/2013 | A01N 25/00 |
| WO | WO-2019006358 A1 * | 1/2019 | |
| WO | WO-2021252438 A1 * | 12/2021 | A01N 43/80 |

OTHER PUBLICATIONS

Simazine Label (Year: 2025).*

* cited by examiner

*Primary Examiner* — Robert A Wax
*Assistant Examiner* — John W Lippert, III
(74) *Attorney, Agent, or Firm* — Pacer K. Udall; Booth Udall, PLC

(57) ABSTRACT

Disclosed are methods of using Simazine for controlling, reducing formation of flowers and seedheads of, and suppressing growth of annual bluegrass (*Poa annua*) in a turf comprising a cool-season turfgrass species. The methods comprise applying an effective dosage of Simazine to the turf. Also disclosed is a method of enhancing color and quality of a cool-season turfgrass species as a result of Penoxsulam treatment applied to a turf comprising the cool-season turfgrass species. The method comprises applying an effective dosage of Simazine to the turf. Further disclosed is a method of selectively controlling seashore *Paspalum* (*Paspalum vaginatum*) in a turf comprising bermudagrass, the method comprising applying an effective dosage of Simazine to the turf.

29 Claims, 24 Drawing Sheets
(19 of 24 Drawing Sheet(s) Filed in Color)

METHOD OF USING SIMAZINE FOR CONTROLLING ANNUAL BLUEGRASS IN COOL SEASON-TURFGRASSES

CROSS-REFERENCE TO RELATED APPLICATIONS

This application claims priority to and the benefit of U.S. provisional patent application No. 63/454,046, filed Mar. 22, 2023, titled “A METHOD OF USING SIMAZINE FOR CONTROLLING ANNUAL BLUEGRASS IN COOL-SEASON TURFGRASSES,” the entirety of the disclosure of which is hereby incorporated by this reference.

TECHNICAL FIELD

This document relates to a method of using Simazine for controlling annual bluegrass in cool-season turfgrasses.

BACKGROUND

Turfgrasses that are categorized as warm-season species, are those that evolved in hot, subtropical or tropical climates. They thrive in hot humid weather and become dormant or even die in cold weather. Non-limiting examples of warm-season species include bermudagrass, *zoysia* grass, and St. Augustine grass. In contrast, cool-season turfgrass species evolved in northern temperate or cool climates. As such, they thrive in moderate temperatures and survive in cold temperatures. Some struggle to survive in hot humid weather and may even become dormant in order to evade lethal temperatures. Non-limiting examples of cool-season turfgrasses are Kentucky bluegrass, ryegrass, bentgrass, and fescue.

Infestation of turfgrasses by annual bluegrass (*Poa annua*) weeds are a severe problem for turfgrass managers throughout most of the world. As an annual plant, it germinates and grows quickly, prolifically produces seed, and dies, all in an annual life cycle. In addition, some biotypes of this species are actually perennial in that they have adapted to favorable environments and survive as a perennial plant and do not die at a programmed time of year. *Poa annua* is categorized as a cool-season species in that it evolved in and is best adapted to northern temperate climates. The annual bluegrass weed species has little endurance of high temperatures, so it’s potential for summer survival is poor.

The presence of *Poa annua* is visually obnoxious and detrimental to the surface performance of turfgrasses (e.g., the rolling of a ball on a golf course turfgrass) during times of the year that it flowers and makes seeds. *Poa annua* frequently invades warm-season turfgrasses. This is particularly the case in cool weather when warm-season turfgrasses are not strongly competing and may even be dormant. At that same time, because of the cool temperatures, the *Poa annua* weeds are in their most competitive state. Hence, the vigorous infestation of desired turfgrass species by *Poa annua*. Many herbicides are able to exploit the differing growth patterns as well as other distinct metabolic features to selectively damage or kill *Poa annua* while not significantly damaging the desired warm-season species. These herbicides are well known and are marketed for this purpose.

Simazine herbicide is currently used for selective control of weeds in agricultural crops, especially corn, but the use of Simazine for control of weeds in cool-season turfgrasses such as ryegrasses, bentgrasses and fescues is not known.

SUMMARY

In one aspect, a method of using Simazine for controlling annual bluegrass (*Poa annua*) in a turf comprising a cool-season turfgrass species is disclosed. The method comprises applying an effective dosage of Simazine to the turf. The effective dosage of Simazine does not unacceptably damage the cool-season turfgrass species.

Implementations may include one or more or all of the following.

The effective dosage of Simazine suppresses growth of annual bluegrass in a turf comprising a cool-season turfgrass species.

The cool-season turfgrass species is rye, bentgrass, or fescue.

The cool-season turfgrass species is rye, and the effective dosage of Simazine is about 0.01 lb AI/A-about 1.0 lb AI/A.

The effective dosage of Simazine is about 0.01 lb AI/A to about 0.25 lb AI/A or about 0.05 lb AI/A to about 0.25 lb AI/A. Simazine is applied at least two times, each application separated by at least one week, for example about one week to about four weeks or about three weeks. Simazine is applied two times or three times.

The effective dosage of Simazine is about 0.25 lb AI/A to about 0.5 lb AI/A. Simazine is applied no more than two times, each application separated by at least one week, for example about one week to about four weeks or about three weeks. For example, Simazine may be only applied one time at an effective dosage about 0.25 lb AI/A to about 0.5 lb AI/A.

The effective dosage of Simazine is about 0.05 lb AI/A to about 1.0 lb AI/A. Simazine is applied one time.

In another aspect, disclosed is a method of using Simazine for reducing formation of flowers and seedheads of annual bluegrass (*Poa annua*). The method comprises applying an effective dosage of Simazine to the annual bluegrass. The effective dosage of Simazine is a sub-lethal dosage of Simazine in relation to annual bluegrass.

Implementations may include one or more or all of the following.

The annual bluegrass is grown in a turf comprising cool-season turfgrass species. The cool-season turfgrass species is rye, bentgrass, or fescue. The effective dosage of Simazine is a sub-lethal dosage of Simazine in relation to both annual bluegrass and the cool-season turfgrass species.

The effective dosage of Simazine is about 0.25 lb AI/A.

In even another aspect, disclosed is a method of enhancing color and quality of a turf comprising the cool-season turfgrass species. The method comprises applying an effective dosage of Simazine to the turf.

Implementations may include one or more or all of the following.

The cool-season turfgrass species is rye, bentgrass, or fescue.

The effective dosage of Simazine is co-administered to the turf with an herbicide, for example, Penoxsulam.

The effective dosage of Simazine administered is about 0.05 lb AI/A to about 0.25 lb AI/A.

The cool-season turfgrass species is rye, and wherein the effective dosage of Simazine is about 0.25 lb AI/A.

The cool-season turfgrass species is bentgrass, and wherein the effective dosage of Simazine is about 0.05 lb AI/A.

In yet another aspect, disclosed is a method of selectively controlling seashore *Paspalum* (*Paspalum vaginatum*) in a turf comprising bermudagrass. The method comprises applying an effective dosage of Simazine to the turf.

Implementations may include one or more or all of the following.

The effective dosage of Simazine is about 0.5 lb AI/A.

In even another aspect, disclosed is a composition comprising Simazine and a ryegrass-removal herbicide. The amount of the ryegrass-removal herbicide may be a manufacturer-recommended amount for removing ryegrass.

Implementations may include one or more or all of the following.

The ryegrass-removal herbicide is Penoxsulam, and wherein the weight ratio of the Simazine and the ryegrass-removal herbicide is 1:1.

The foregoing and other aspects, features, and advantages will be apparent from the Description, Claims, and Drawings.

BRIEF DESCRIPTION OF THE DRAWINGS

The patent or application file contains drawings executed in color. Copies of this patent or patent application publication with color drawing(s) will be provided by the Office upon request and payment of the necessary fee.

FIG. 11A shows a soon-to-be-dormant bermudagrass turf treated with Simazine four days prior to planting ryegrass to the turf. FIG. 11B shows the same test turf 43 days after seeding the area with ryegrass, which contains healthy young ryegrass.

DETAILED DESCRIPTION

Figure 1A:
FIG. 1A is a photograph of a ryegrass turf test area that contains annual bluegrass after 90 days of treatment. The area was subdivided into four sections for four treatment.

Detailed aspects and applications of the disclosure are described below in the following detailed description of the technology. For the purposes of explanation, numerous specific details are set forth in order to provide a thorough understanding of the various aspects of the disclosure. It will be understood, however, by those skilled in the relevant arts, that implementations of the technology disclosed herein may be practiced without these specific details. It should be noted that there are many different and alternative applications for the disclosed technologies. The full scope of the technology disclosed herein is not limited to the examples that are described below.

As required, detailed implementations of the present disclosure are included herein. It is to be understood that the disclosed implementations are merely exemplary of the invention that may be implemented in various forms. Therefore, specific details disclosed herein are not to be interpreted as limits, but merely as a basis for teaching one skilled in the art to employ the present invention. The specific examples below will enable the disclosure to be better understood. However, they are given merely by way of guidance and do not imply any limitation.

The present disclosure may be understood more readily by reference to the following detailed description taken in connection with the accompanying figures and examples, which form a part of this disclosure. It is to be understood that this disclosure is not limited to the specific materials, methods, applications, conditions, or parameters described and/or shown herein, and that the terminology used herein is for the purpose of describing particular implementations by way of example only and is not intended to be limiting of the claimed inventions.

In general, it is intended that the words and phrases in the specification and the claims be given their plain, ordinary, and accustomed meaning to those of ordinary skill in the applicable arts.

Notwithstanding, in describing implementations of using Simazine, the following terminology will be used in accordance with the definitions and explanations set out below. Notwithstanding, other terminology, definitions, and explanations may be found throughout this document as well.

As used herein, "Simazine" is a term used in its broadest sense and refers to the compound of the chemical structure below having a molecular formula $CH_3CH_2NH(C_3N_3Cl)NHCH_2CH_3$ with an IUPAC name of 6-chloro-2-N,4-N-diethyl-1,3,5-triazine-2,4-diamine:

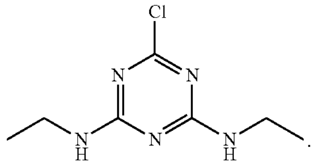

Simazine was first marketed by Geigy in 1956. Simazine has been marketed in 4 L, 90DF, 4F, 90WDG and 80W formulations. Simazine may also be known by the following trade names and other names: CAS 122-34-9, Gesatop, Princep, Simanex, Aquazine, Tafazine, Herbex, Radocon, Batazina, Herbazin, Symazine, Taphazine, Amizine, Bitemol, Gesapun, Herboxy, Printop, Radokor, Simadex, Zeapur, Herbazin 50 or Herbazin-50, Primatol S, Aktinit S, Hungazin DT, Gesaran, Premazine, Simazin, Simazine, Simazine 80W, Gesatop 50, Tafazine 50-W, Cekuzina-S, Primatel S, 1,3,5-Triazine-2,4-diamine, 6-chloro-N,N'-diethyl-CAT (herbicide), Yrodazin, Azotop, Simatsin-neste, 6-Chloro-N2,N4-diethyl-1,3,5-triazine-2,4-diamine, Herbatoxol S, Triazine A 384, Geigy 27,692, 2-Chloro-4,6-bis (ethylamino)-1,3,5-triazine, 6-Chloro-N,N'-diethyl-1,3,5-triazine-2,4-diamine, 2,4-Bis(ethylamino)-6-chloro-s-triazine, 2-Chloro-4,6-bis(ethylamino)-s-triazine, Bitemol S 50, s-Triazine, 2-chloro-4,6-bis(ethylamino)-Framed, A 2079, H 1803, W 6658, 2,4-Bis(ethylamino)-6-chloro-1,3,5-triazine, G 27692, Bitemol S-50, 1-Chloro-3,5-bis(ethylamino)-2,4,6-triazine, G-27692, SG0C34SMY3, 6-chloro-2-N,4-N-diethyl-1,3,5-triazine-2,4-diamine, CHEBI:27496, NSC-25999, 6-Chloro-N,N'-diethyl-[1,3,5]triazin-2,4-diamine, NCGC00094524-01, Cekusima, Batazine FLO, Herbex (pesticide), Tafazine (VAN), Caswell No. 740, 1,3,5-Triazine-2,4-diamine, 6-chloro-N2,N4-diethyl-6-chloro-N (2),N(4)-diethyl-1,3,5-triazine-2,4-diamine, CCRIS 1469, HSDB 1765, EINECS 204-535-2, NSC 25999, UNII-SGOC34SMY3, EPA Pesticide Chemical Code 080807, BRN 0010895, cekuzinas, permazine, Herboxydiene, Printrex, Simatox, Simazat, Cekusan Gesatop, AI3-51142, Simazin solution, Princep 4G, Princep 4 L, Simazine 50, Aquazine 90WDG, Caliber 90, Gesatop-50, Princep 80W, Triazine A384, Sim-Trol 4 L, Princep Caliber 90, 2,4-Bis (aethylamino)-6-chlor-1,3,5-triazin [German], Spectrum_001809, SIMAZINE [HSDB], SIMAZINE [IARC], SpecPlus_000400, Enamine_005673, SIMAZINE [ISO], SIMAZINE [MI], Spectrum2_001879, Spectrum3_000820, Spectrum4_000660, Spectrum5_001950, 2,4-Bis(aethylamino)-6-chlor-1,3,5-triazin, Opreal_871264, SCHEMBL37774, 1-Chloro-3,4,6-triazine, BSPBio_002319, KBioGR 001039, KBioSS_002302, Simazine, analytical standard, SPECTRUM330028, BIDD: ER0337, DivK1c_006496, SPBio_001758, s-Triazine,6-bis (ethylamino)-, CHEMBL1605837, DTXSID4021268, KBio1_001440, KBio2_002300, KBio2_004868, KBio2_007436, KBio3_001819, [6-chloro-4-(ethylamino) (1,3,5-triazin-2-yl)]ethylamine, ZINC121575, HY-B2046, NSC25999, Simazine 100 microg/mL in Acetone, Tox21_111291, Tox21_202378, Tox21_300748, CCG-39417, MFCD00023174, STK386441, 2-Chloro-4,6-di(ethylamino)triazine, 2-Chloro-4,6-bis(ethylamino)triazine, 4,6-Bis(ethylamino)-2-chlorotriazine, AKOS003629500, Tox21_111291_1, KS-5070, Simazine 10 microg/mL in Acetonitrile, WLN: T6N CN ENJ BM2 DM2 FG, IDI1_007908, Simazine 100 microg/mL in Acetonitrile, NCGC00094524-02, NCGC00094524-03, NCGC00094524-04, NCGC00094524-05, NCGC00094524-06, NCGC00094524-07, NCGC00094524-09, NCGC00254653-01, NCGC00259927-01, AC-12676, DB-041663, 6-Chloro-N, N'-diethyl-2,4-diaminetriazine, CS-0014141, FT-0603326, 11146, s-Triazine, 2,4-bis(ethylamino)-6-chloro-Simazine, PESTANAL, 1-Chloro-3,5-Bisethylamino-2,4,6-Triazine, 2,4-Di(ethylamino)-6-chloro-1,3,5-triazine, 2-chloro-4,6-bis-ethylamino-1,3,5-triazine, H10514, Chloro-4,6-bis(ethylamino)-s-triazine, Q416160, J-004790, 1,5-Triazine-2,4-diamine, 6-chloro-N,N'-diethyl-, 2,4-Diamine-6-chloro-N, N'-diethyl-1,3,5-triazine, BRD-K01416914-001-02-3, N,N'-diethyl-6-chloro-[1,3,5]triazine-2,4-diamine, 6-Chloro-N, N'-diethyl-1,3,5-triazine-2,4-diyldiamine, 6-chloro-N2,N4-diethyl-1,3,5-triazine-2,4-diamine.

As used herein, "Penoxsulam" is a term used in its broadest sense and refers to the compound of the chemical structure below having a molecular formula $C_{16}H_{14}F_5N_5O_5S$ with an IUPAC name of 2-(2,2-difluoroethoxy)-N-(5,8-dimethoxy-[1,2,4]triazolo[1,5-c]pyrimidin-2-yl)-6-(trifluoromethyl)benzenesulfonamide:

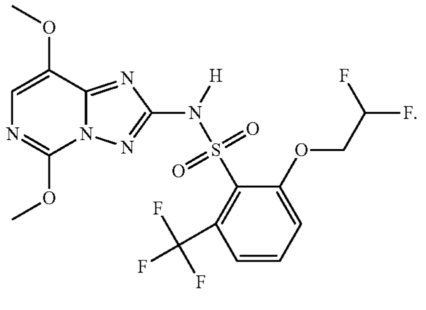 [SMILES: COc1cnc(OC)n2nc(NS(=O)(=O)c3c(OCC(F)F)cccc3C(F)(F)F)nc12]

Penoxsulam may also be known by the trade name Sapphire.

As used herein, "annual bluegrass" is a term used in its broadest sense and refers to the weed species *Poa annua*. Accordingly, the terms "annual bluegrass" and "*Poa annua*" are used interchangeably herein.

As used herein, "controlling" or "control" are terms used in their broadest sense and may refer to outright killing a weed plant species with a lethal dosage, reducing the competitive ability of the weed plant species relative to the desired cool-season turfgrass species with a sub-lethal dosage, or modifying the behavior of the weed plant species with a sub-lethal dosage, all of which without harming or unacceptably injuring the desired cool-season turfgrass species. With respect to *Poa annua*, the term controlling can refer to eradication of *Poa annua* from the turfgrass crop, reduction of the *Poa annua* population relative to the turfgrass crop, sub-lethal reduction of *Poa annua* growth, and/or complete or partial reduction of *Poa annua* seedhead production.

As used herein, "unacceptably injured" or "unacceptably injuring" are terms used in their broadest sense and may refer to when desired turfgrass cover of ground (or ground coverage) is reduced by a treatment or the desired turfgrass is visually compromised (for example, the turf is off-color or thinned).

As used herein, "cool-season turfgrasses" is a term used in its broadest sense and may refer to ryegrass, bentgrass, fescue, or other C-3 grasses which are cultivated as turfgrass.

As used herein, "AI/A" is a term used in its broadest sense and refers to active ingredient/acre or active ingredient per acre.

As used herein, "application rate" or "dosage" are terms used in their broadest sense and refer to the amount or weight of active ingredient per acre. Application rates and frequency vary according to the turfgrass species and prevailing temperatures.

As used herein, the term "co-administering" or "co-administration" refers to application of more than one treatment/herbicide in a single composition or in separate compositions that are administering consecutively.

As used herein, "about" is a term used in its broadest sense in the context of numeric values and denotes an interval of accuracy, familiar and acceptable to a person skilled in the art. The interval can be ±2% of the given value, preferably ±5%, and most preferably ±10% of the numeric value, where applicable.

The singular forms "a," "an," and "the" include plural referents unless the context clearly dictates otherwise. Thus, for example, reference to "a step" includes reference to one or more of such steps.

The word "exemplary," "example," or various forms thereof are used herein to mean serving as an example, instance, or illustration. Any aspect described herein as "exemplary" or as an "example" is not necessarily to be construed as preferred or advantageous over other aspects. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented but have been omitted for purposes of brevity.

When a range of values is expressed, another implementation includes from the one particular value and/or to the other particular value. Similarly, when values are expressed as approximations, by use of the antecedent "about," it will be understood that the particular value forms another implementation. All ranges are inclusive and combinable.

Throughout the description and claims of this specification, the words "comprise" and "contain" and variations of the words, for example "comprising" and "comprises", mean "including but not limited to", and are not intended to (and do not) exclude other components.

The term "plurality", as used herein, means more than one.

Applicant has discovered novel applications of Simazine and its related analog atrazine in management of turfgrasses. For the first time, Simazine and atrazine are found to be useful for improving the quality and appearance of turfs comprising cool-season turfgrasses.

In one aspect, a method of controlling annual bluegrass (*Poa annua*) in turf comprising a cool-season turfgrass species is described, wherein an effective dosage of Simazine or atrazine is administered to the turf.

The most objectionable aspect of annual bluegrass infestation of a desired turfgrass is its characteristic prolific production of flowers and seedheads. The white flowers make an otherwise green turf appear white. The prolific seedheads that follow the flowering are also visually objectionable and pose a hindrance to the rolling of a ball on the surface. Another negative aspect of annual bluegrass infestation in turf comprising cool-season turfgrass species is that annual bluegrass has a comparatively poor tolerance of high temperature. Hence, the quality of the infested turf may degrade upon the death of the annual bluegrass component in mid-summer.

Accordingly, in another aspect, a method of reducing formation of flowers and seedheads of annual bluegrass in a turf comprising a cool-season turfgrass species is also described. In another aspect, a method of enhancing the color of turf comprising a cool-season turfgrass species is described, wherein an effective dosage of Simazine or atrazine is administered to the turf.

The effective dosage of Simazine or atrazine is an application rate of the herbicide where the turf is not unacceptably injured upon administration of the herbicide. The effective dosage may be lower when Simazine or atrazine is applied in multiple applications rather than a single application. The multiple applications would use smaller application rates, compared to a single application with a large application rate. In some implementations, each application of Simazine or atrazine is separate by a period of at least one week, for example between two weeks to four weeks. Because atrazine has a lesser margin of safety on the desired cool-season turfgrass species, in preferred embodiments, an effective dosage of Simazine is administered to the turf comprising a cool-season turfgrass species to control annual bluegrass infestation in the turf, to enhance the color of the turf comprising a cool-season turfgrass species, and/or to reduce formation of flowers and seedheads of annual bluegrass in a turf.

In yet another aspect, a method of enhancing herbicidal effects of other herbicides is described. The method may comprise co-administering Simazine with another herbicide to remove cool-season turfgrass species, for example, ryegrass. The another herbicide may be Penoxsulam. Accordingly, a composition comprising Simazine and herbicide for killing cool-season turfgrass species is disclosed. In some aspects, the herbicide kills ryegrass. Thus, in some implementations, the composition comprises Simazine and ryegrass-removal herbicide, wherein the amount of the ryegrass-removal herbicide in the composition is a manufacturer-recommended amount for removing ryegrass. In some aspects, the ryegrass-removal herbicide is Penoxsulam and the weight ratio of the Simazine and Penoxulam is 1:1.

In still another aspect, a method of selectively controlling seashore *Paspalum* (*Paspalum vaginatum*) in a turf comprising bermudagrass is described, wherein an effective dosage of Simazine is administered to the turf. The effective dosage of Simazine for controlling seashore *Paspalum* infestation in a turf comprising bermudagrass is an application rate of the herbicide where the turf comprising bermudagrass is not unacceptably injured upon administration of the herbicide, for example, between 0.5 and 1.0 lb AI/A.

1. Control of Annual Bluegrass in Cool-Season Turfgrasses

*Poa annua* is an undesirable comingled contaminant of turfgrasses. It has the following characteristics that make such contamination undesirable. *Poa annua* has a relatively poor tolerance for high temperature. Hence, it's tendency for death in summers leaves turf in undesirable condition.

*Poa annua* also produces prolific seedheads which begin as white flowers that are aesthetically undesirable. Later, the seedheads produce seeds which are also visually objectionable. Further, the seeds deflect golf balls as they roll across a surface, hence reducing the play quality of putting greens.

Additionally, *Poa annua* tends to puff up in afternoons in cold weather due to a substantial growth rate when other grasses may have minimal growth. When infesting desirable turfgrass species on putting greens, the afternoon puffing deflects the paths of golf balls as they roll across putting greens.

Conversely, in hot weather, the temperature-stressed *Poa annua* may have minimal growth relative to comingled desirable turfgrasses. Again, this differential height causes deflection of golf balls rolling on putting greens.

The texture and thatch accumulation of a *Poa annua* turf surface is different than those of desirable turfgrasses. Hence, *Poa annua* infestations of desirable turfgrasses results in an inconsistent surface for purposes of play performance.

*Poa annua* has an aesthetically-undesirable yellowish-green color compared to other cool-season turfgrass species.

Because both cool-season turfgrasses and *Poa annua* share similar growth patterns and metabolic features, there is little distinction between the turfgrass and the weed to exploit for selective control. Hence, unlike in warm-season turf grasses, few herbicides are commercially available for control of *Poa annua* in cool-season turfgrasses. Those that are known and marketed have unreliable performance and control selectivity.

Applicant surprisingly discovered that Simazine can selectively control annual bluegrass weeds while not unacceptably damaging desired cool-season turfgrass species. In other words, when annual bluegrass weeds are infesting desired cool-season turfgrass species (ryegrass, bentgrass, fescue), Simazine controls the annual bluegrass without damaging the desired species.

Selective control is the ability of Simazine to detrimentally affect the weed species without unacceptably injuring the desired turfgrass species. Different metabolic activity in response to temperature may be exploited to achieve selectivity. Annual bluegrass is metabolically active and growing with vigor in cold temperatures. During this time of high metabolic activity, it is sensitive to the herbicidal and regulatory effects of Simazine herbicide.

At those same cold temperatures, desired turfgrass species (ryegrass, bentgrass, fescue) have comparatively low metabolic activity and have thus have lesser sensitivity (greater tolerance) to Simazine treatments. Applying Simazine at a rate of 0.05-1.0 lb AI/A to a turf comprising cool-season turfgrass species results in selective control of annual bluegrass. Notably, this application rate may be applied to cool-season turfgrasses in a wide variety of climates and elevations.

The desired cool-season turfgrass species have different tolerances of Simazine applications. Hence, the application rates and schemes are different among those species in order to accommodate the variable tolerance without injuring the desired species.

With respect to ryegrass turf, the application rate for controlling annual bluegrass infestation of ryegrass turf generally ranges between 0.1 and 1.0 lb AI/A. Also, multiple applications of lower rates may provide greater safety to the ryegrass than a higher rate single application even though both may effectively control the annual bluegrass.

In contrast, bentgrass turfgrass species are more sensitive to Simazine application than ryegrass. Hence, in order to reduce the potential for bentgrass injury, lower application rates are appropriate. Appropriate application rate for annual bluegrass control in bentgrass turfgrass generally ranges between 0.05 and 0.25 lb AI/A. Several treatment regimens of Simazine per year may be necessary, and annual bluegrass control in bentgrass turf would be a longer-term program.

In some implementations, a single treatment regimen comprises multiple applications of Simazine until the instant annual bluegrass infestation is controlled. If another episode of annual bluegrass infestation appears later, then a second treatment regimen may begin.

A person having ordinary skill in the art would be able to determine the dose of Simazine for a particular cool-season turfgrass species in its growth environment and climate through routine experimentation. For example, if the annual bluegrass infestation does not seem well controlled, then the Simazine may be administered to turf comprising cool-season turfgrasses may be multiple times with each application separated by at least one week and each application providing a comparative lower dosage than if Simazine were administered in a single application. In some implementations, each application in a treatment regime is separated by two to four weeks. In a particular implementation, each application in a treatment regime is separated by three weeks.

Figure 10:
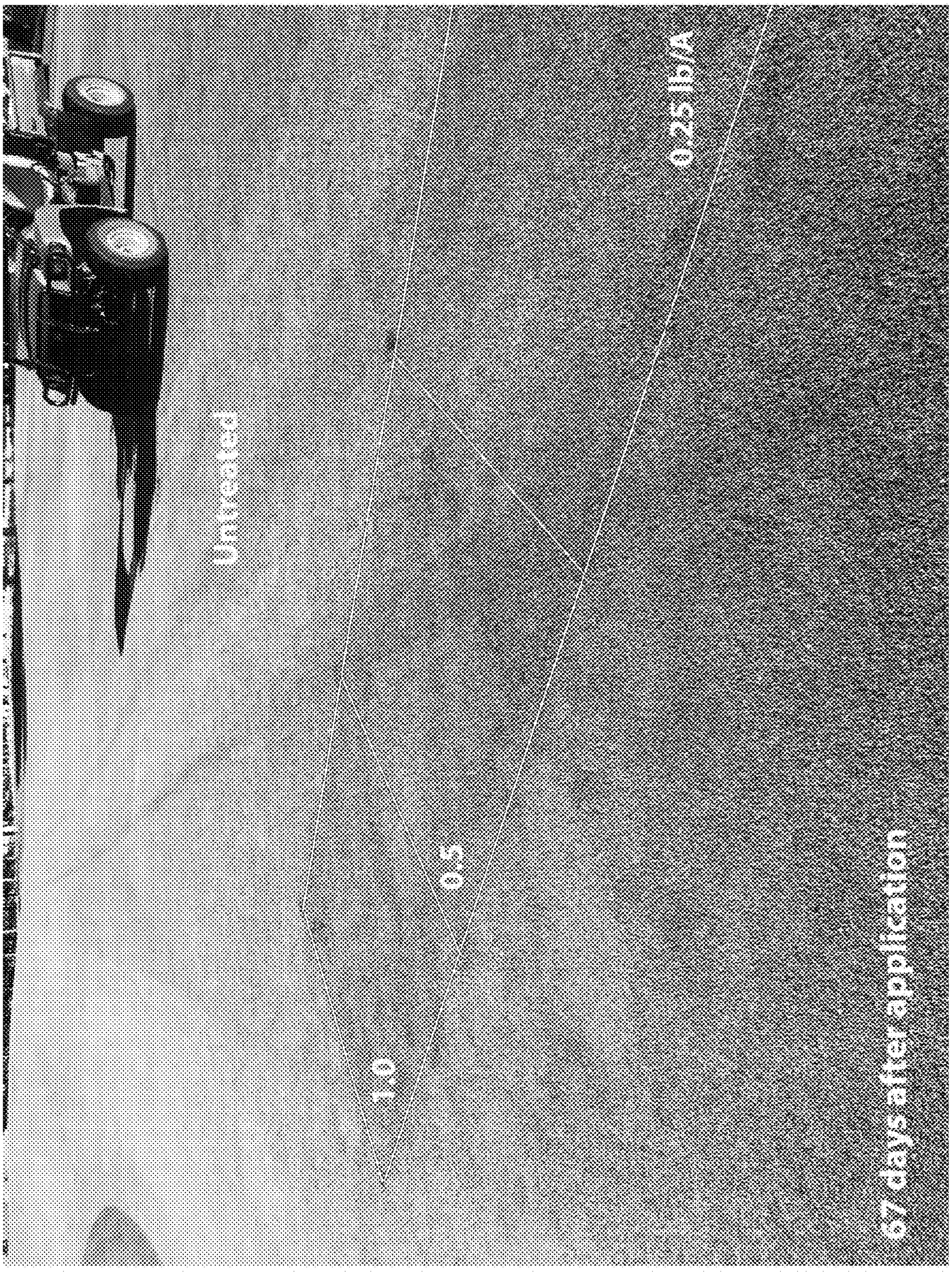
FIG. 10 is a photograph of a test turf in a cool high-altitude climate. As with the test turfs located in hot climates, such as Phoenix, AZ, the application of an effective dose of Simazine specific to the climate of this test turf resulted in control of annual bluegrass infestation and produced a darker green color compared to the untreated turf.

Unless noted otherwise, the data and results shown herein are from trials performed in Phoenix, AZ and would be representative of application of the methods described herein in a hot climate. However, Simazine is effective in management of annual bluegrass infestation in a turf comprising cool-season turfgrass species in cool, high-altitude climates as well as in hot climates (see FIG. 10). The tests were conducted according to standards required by the U.S. Environmental Protection Agency for evaluating herbicides.

Figure 1B:
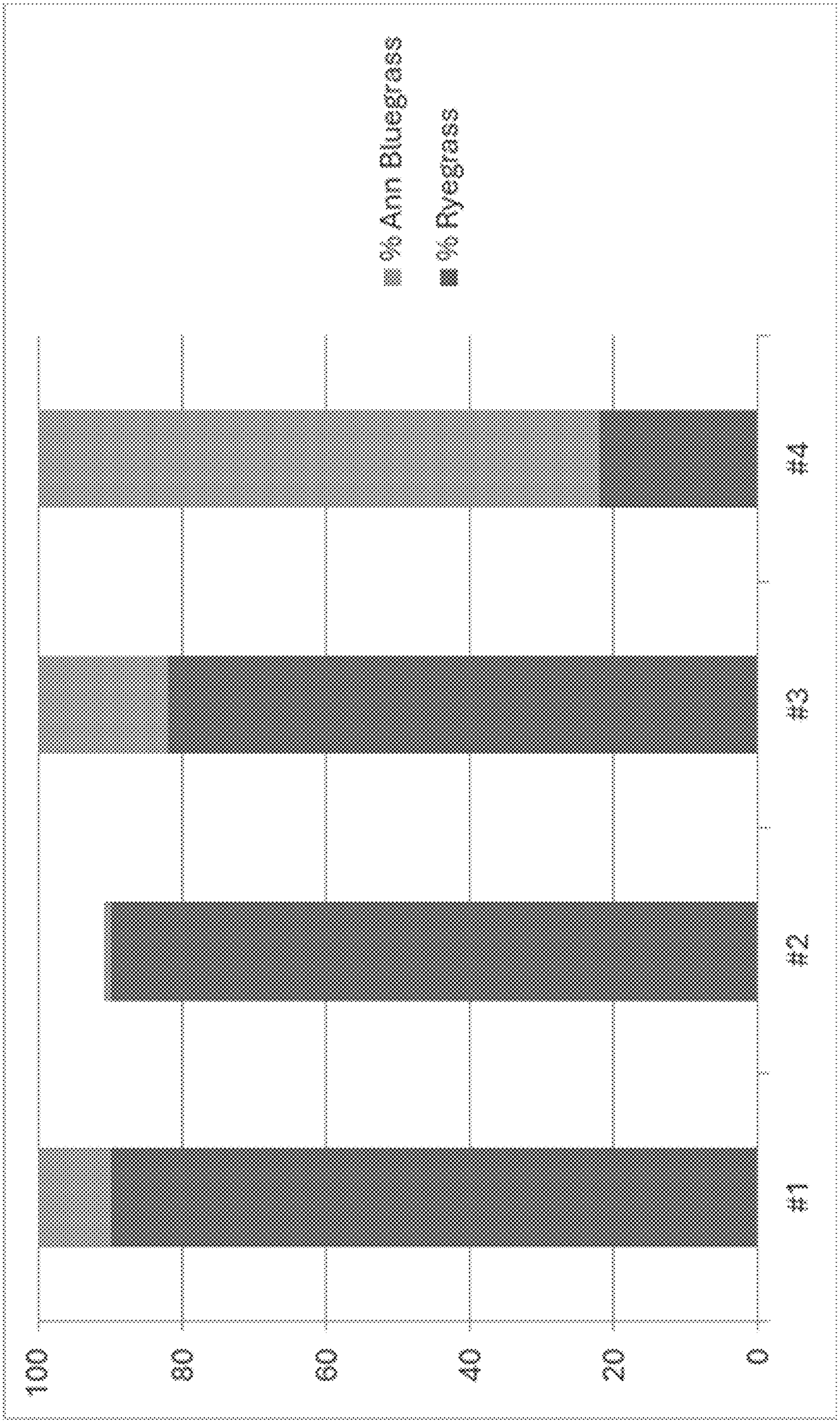
FIG. 1B depicts a graph quantifying the distribution of ryegrass and annual bluegrass in the test area.
Figure 2A:
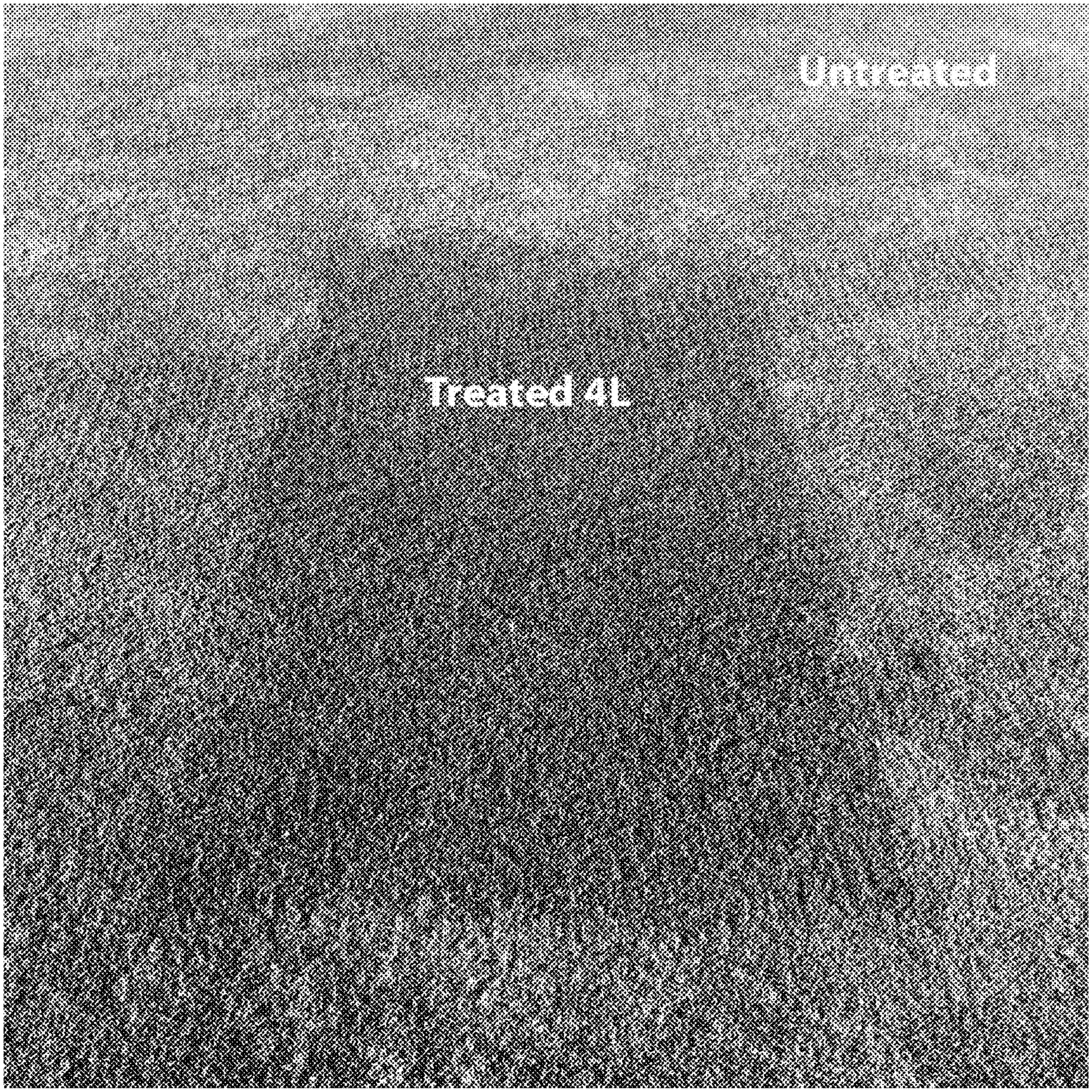
FIG. 2A and FIG. 2B are photographs showing selective control of annual bluegrass in a test site with ryegrass turf different from the site of FIG. 1A. The test site of FIG. 2A received a single application of Simazine at a higher application rate of 1.0 lb AI/A. The test site of FIG. 2A received a single application of Simazine at an application rate of 0.75 lb AI/A.
Figure 2B:
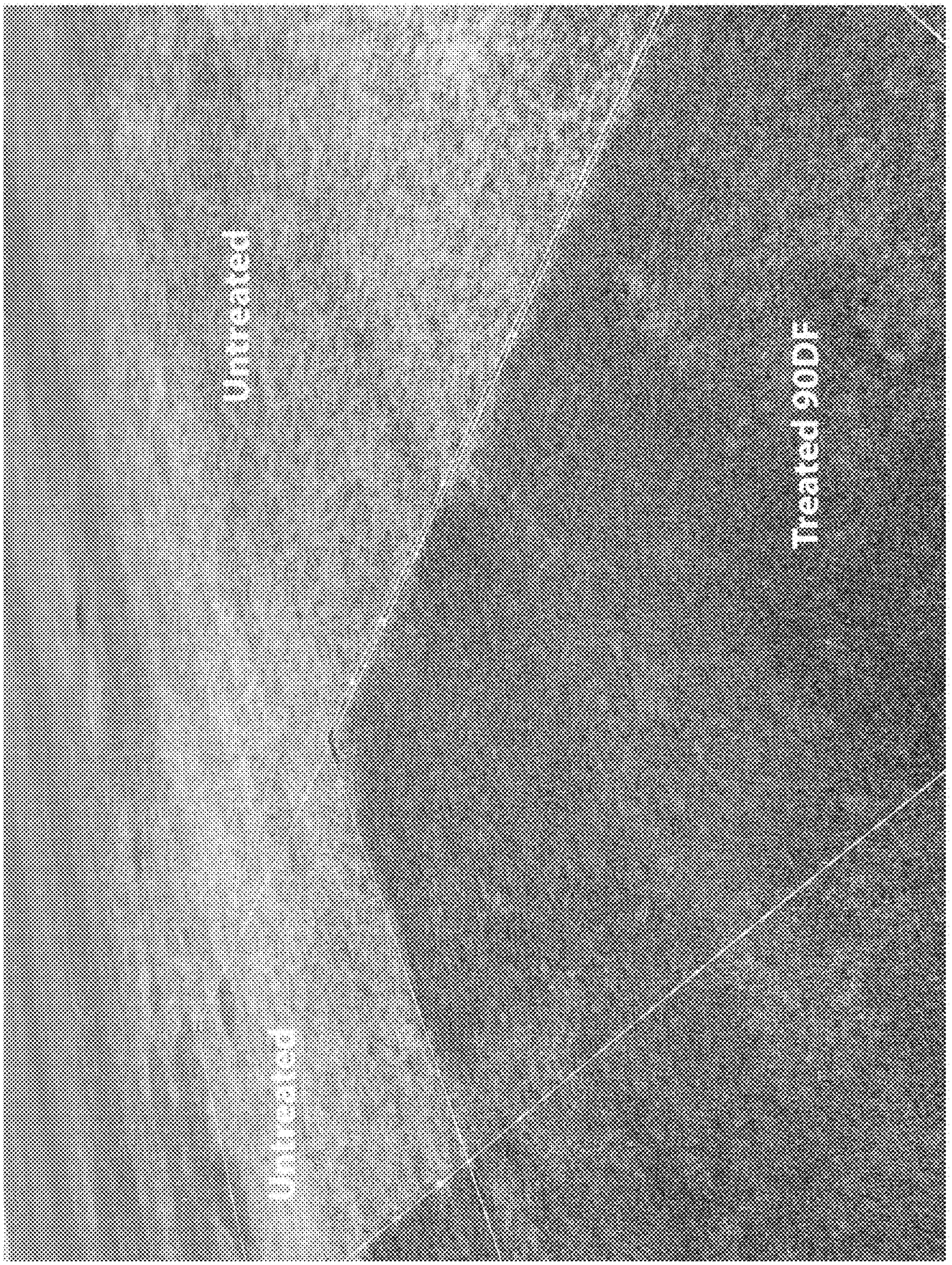
Figure 3A:
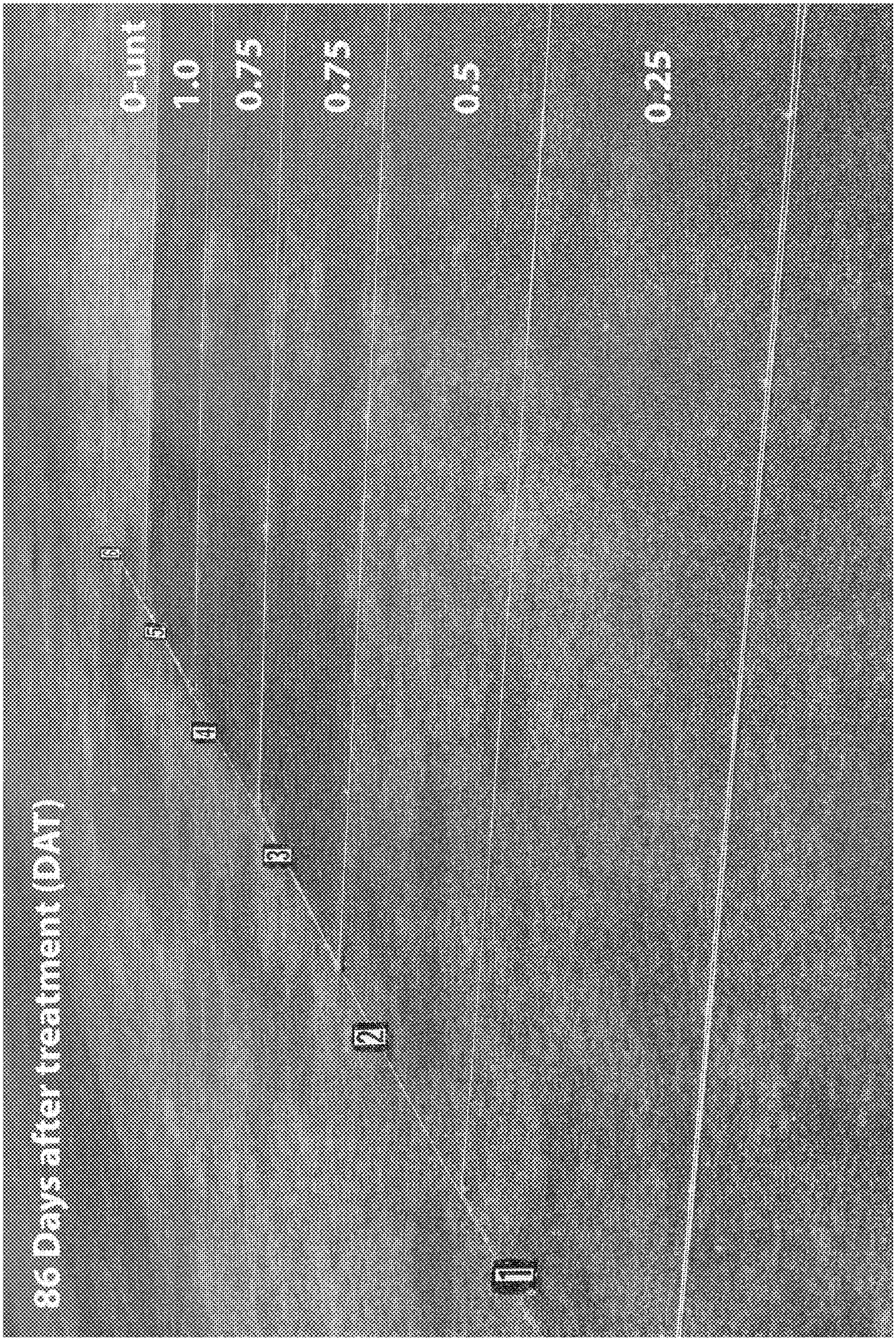
FIG. 3A is a photograph of a ryegrass turf test area that contains annual bluegrass after 86 days of treatment. The area was subdivided into five sections to compare the effect of annual bluegrass control with a single application of Simazine at four different application rates.
Figure 3B:
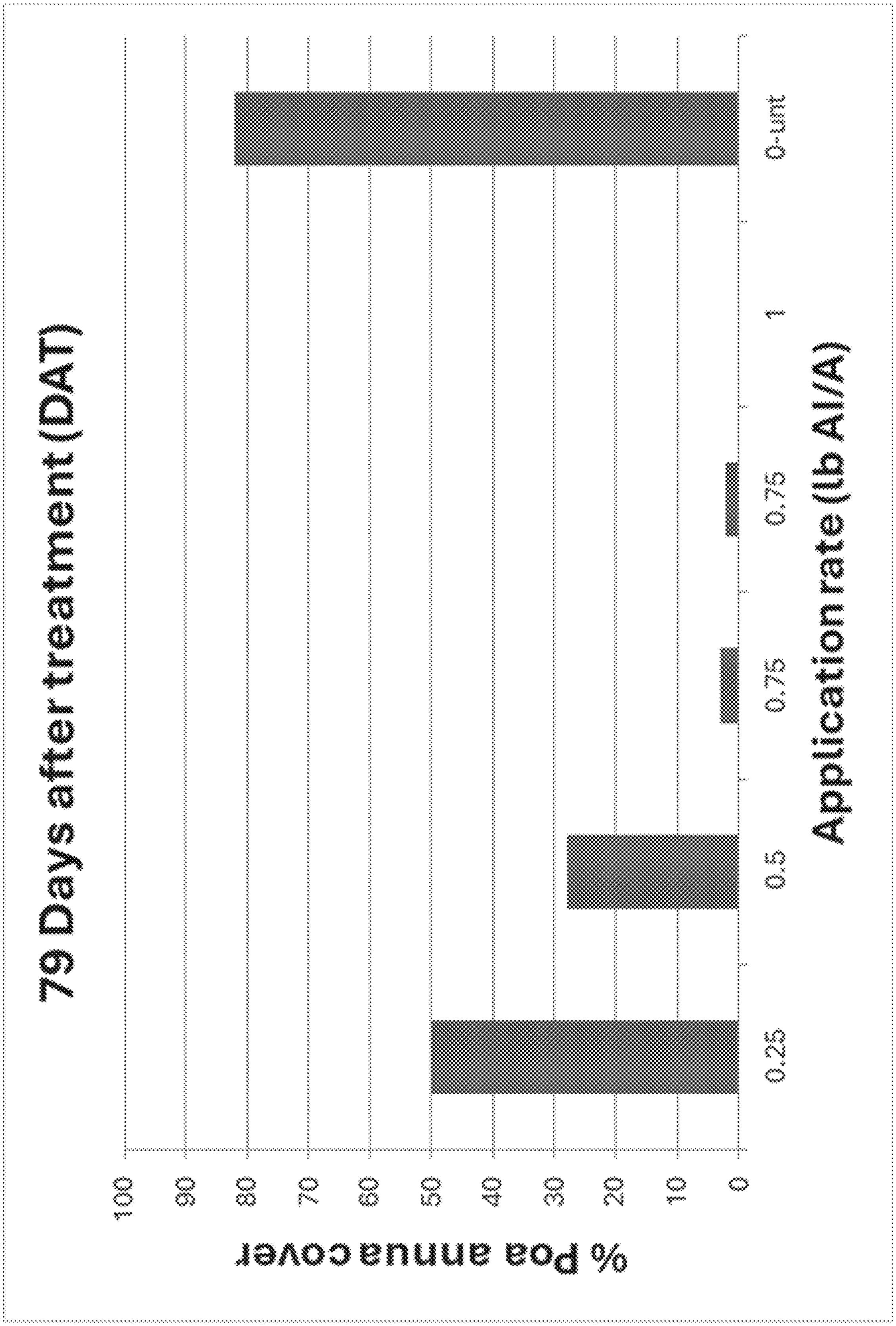
FIG. 3B depicts a graph quantifying percentage of annual bluegrass in the test area at 79 days after treatment.
Figure 4A:
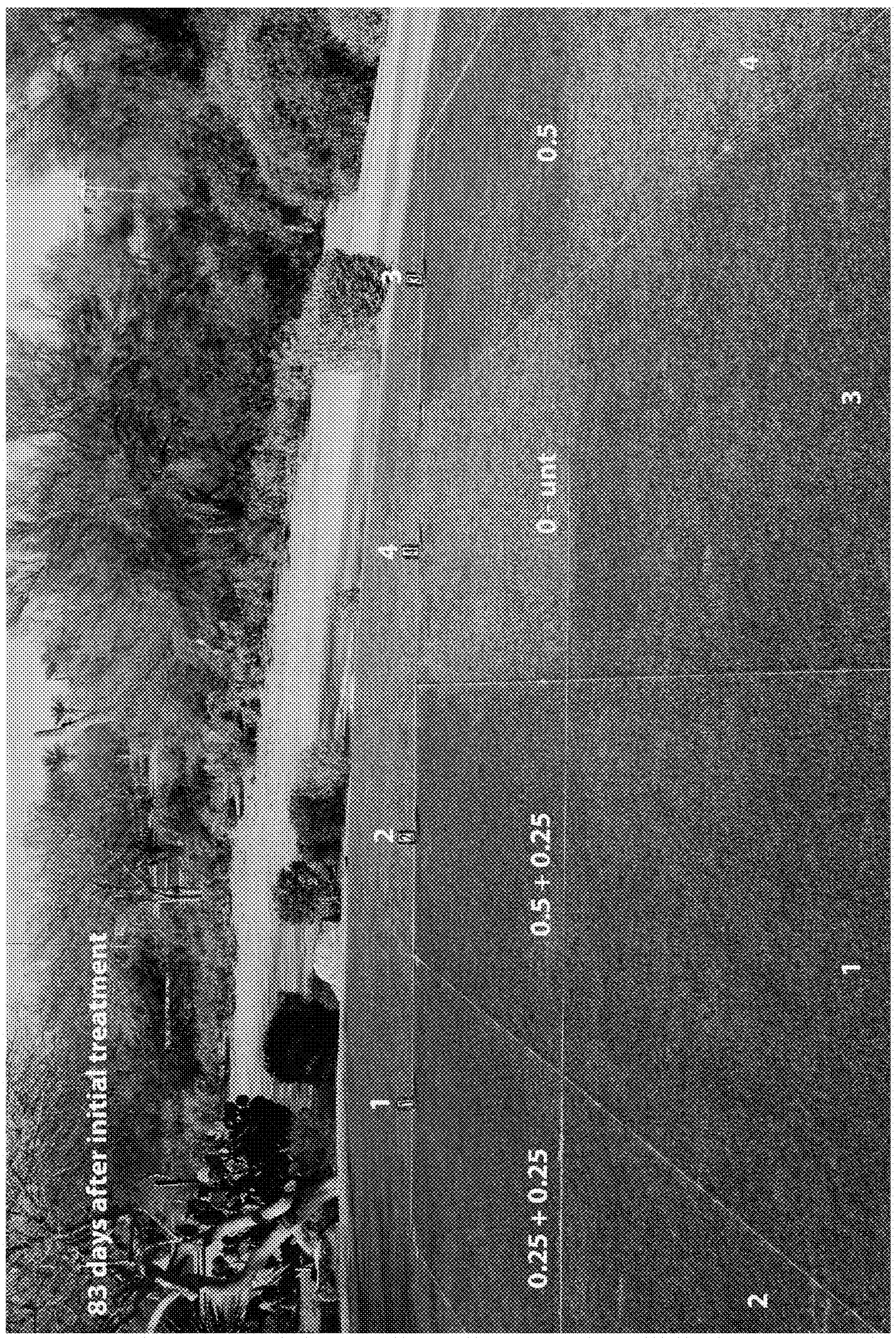
FIG. 4A is a photograph of a ryegrass turf test area that contains annual bluegrass (on a different property as FIG. 3A) after 83 days of treatment. The area was subdivided into four sections to compare the effect of annual bluegrass control with a single application or multiple applications of Simazine at varying application rates.
Figure 4B:
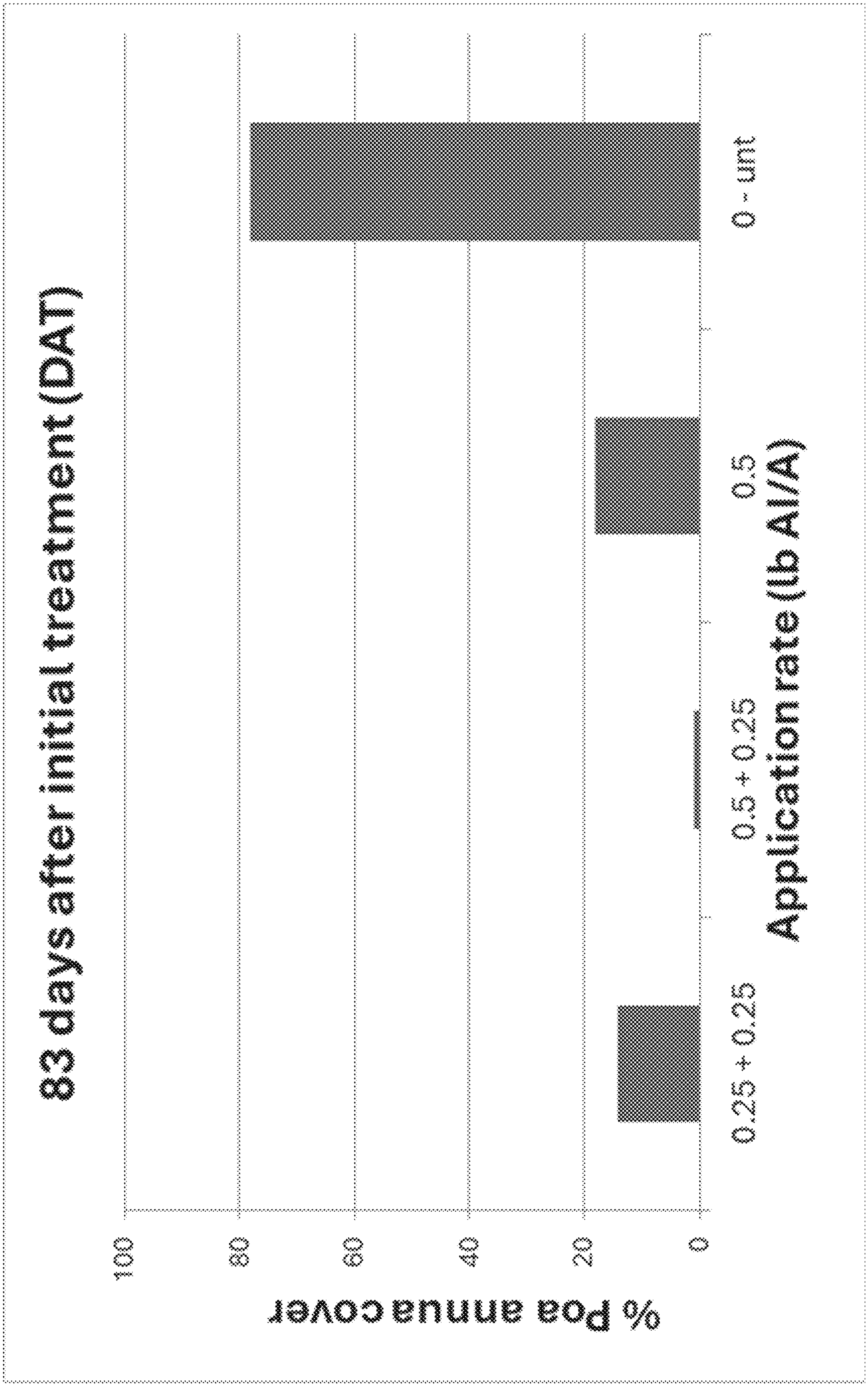
FIG. 4B depicts a graph quantifying percentage of annual bluegrass in the test area at 83 days after treatment.
Figure 5A:
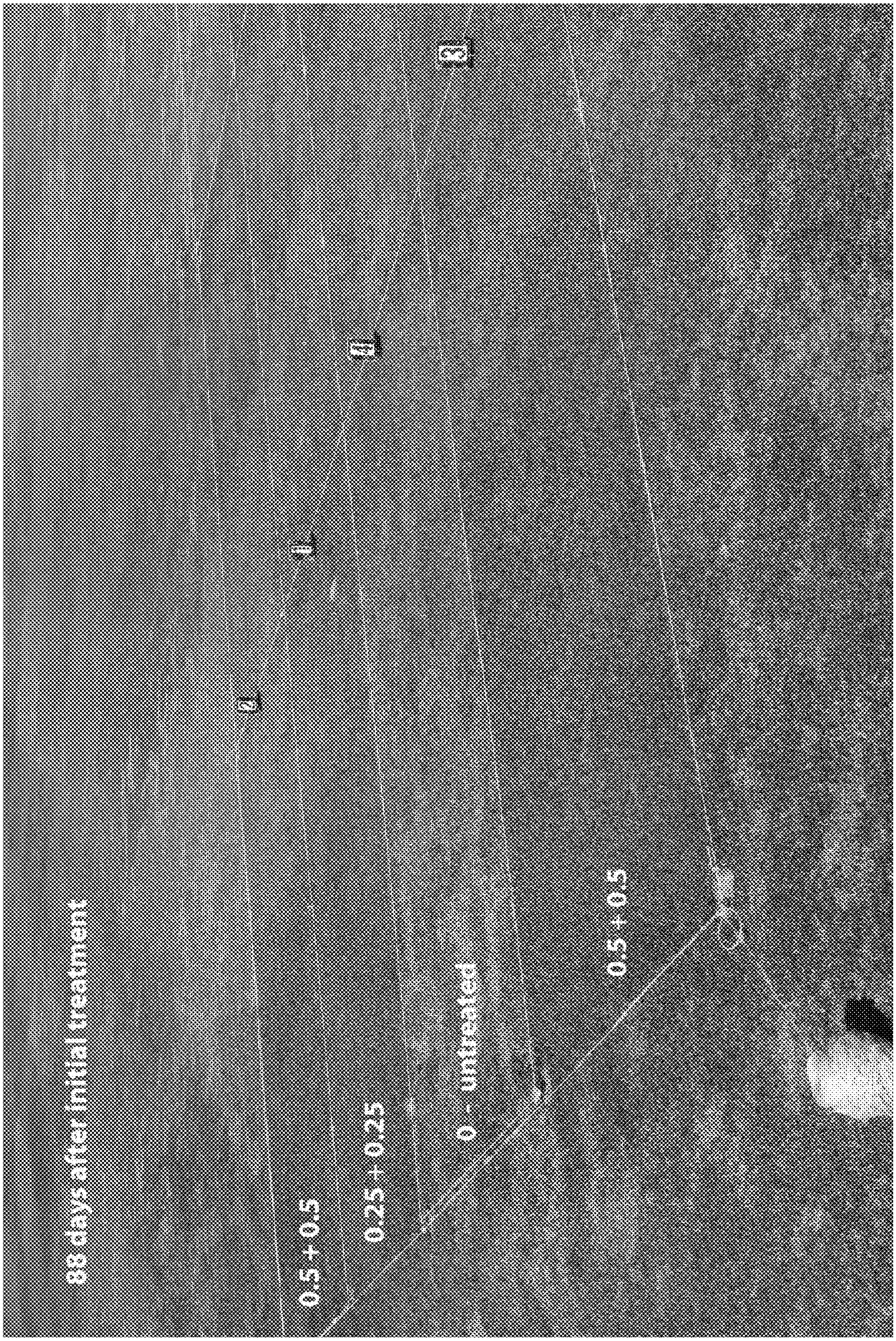
FIG. 5A is a photograph of a ryegrass turf test area that contains annual bluegrass (on a different property as FIG. 3A) after 88 days of treatment. The area was subdivided into four sections to compare the effect of annual bluegrass control with a single application or multiple applications of Simazine at varying application rates.
Figure 5B:
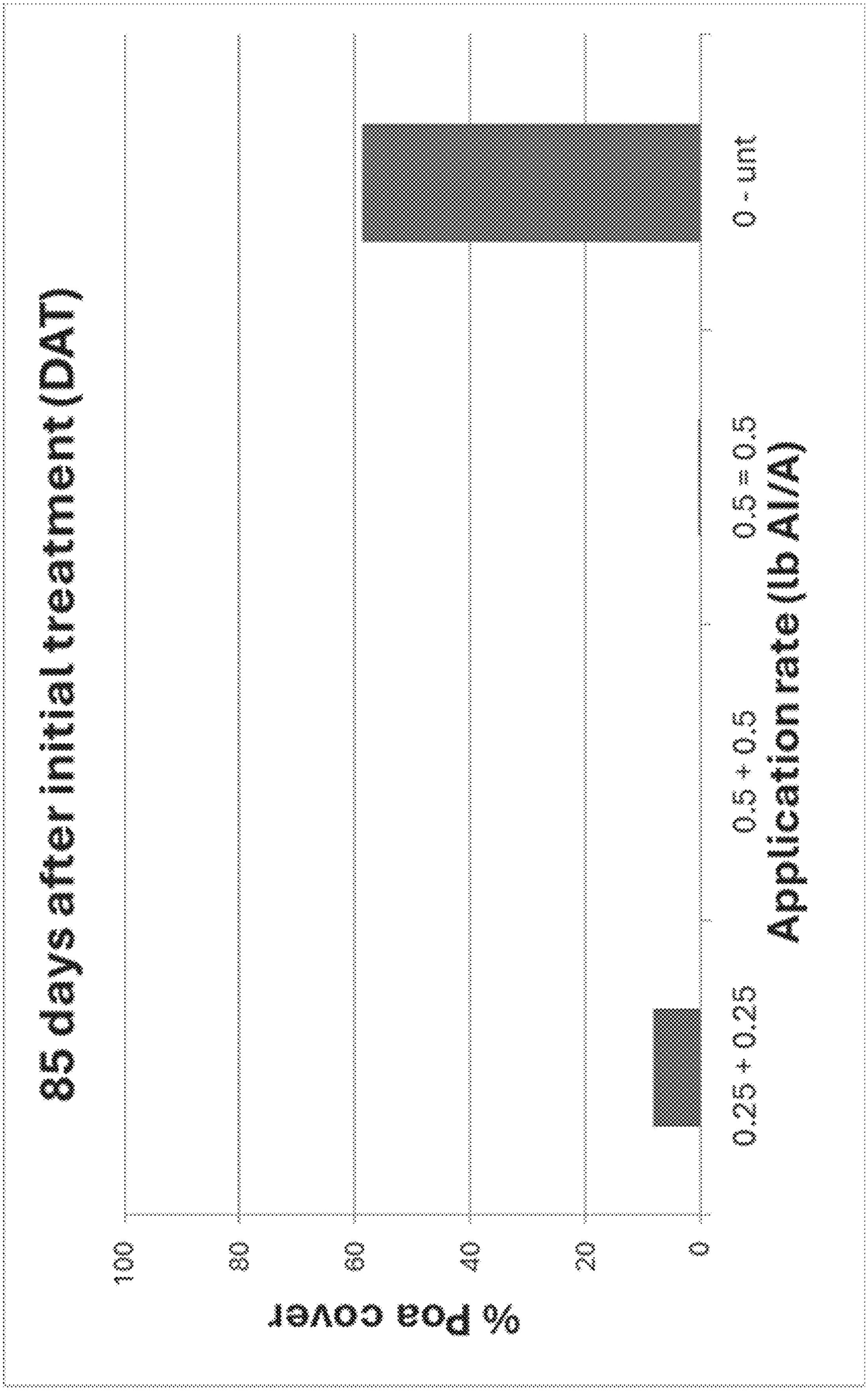
FIG. 5B depicts a graph quantifying percentage of annual bluegrass in the test area at 85 days after treatment.
Figure 6A:
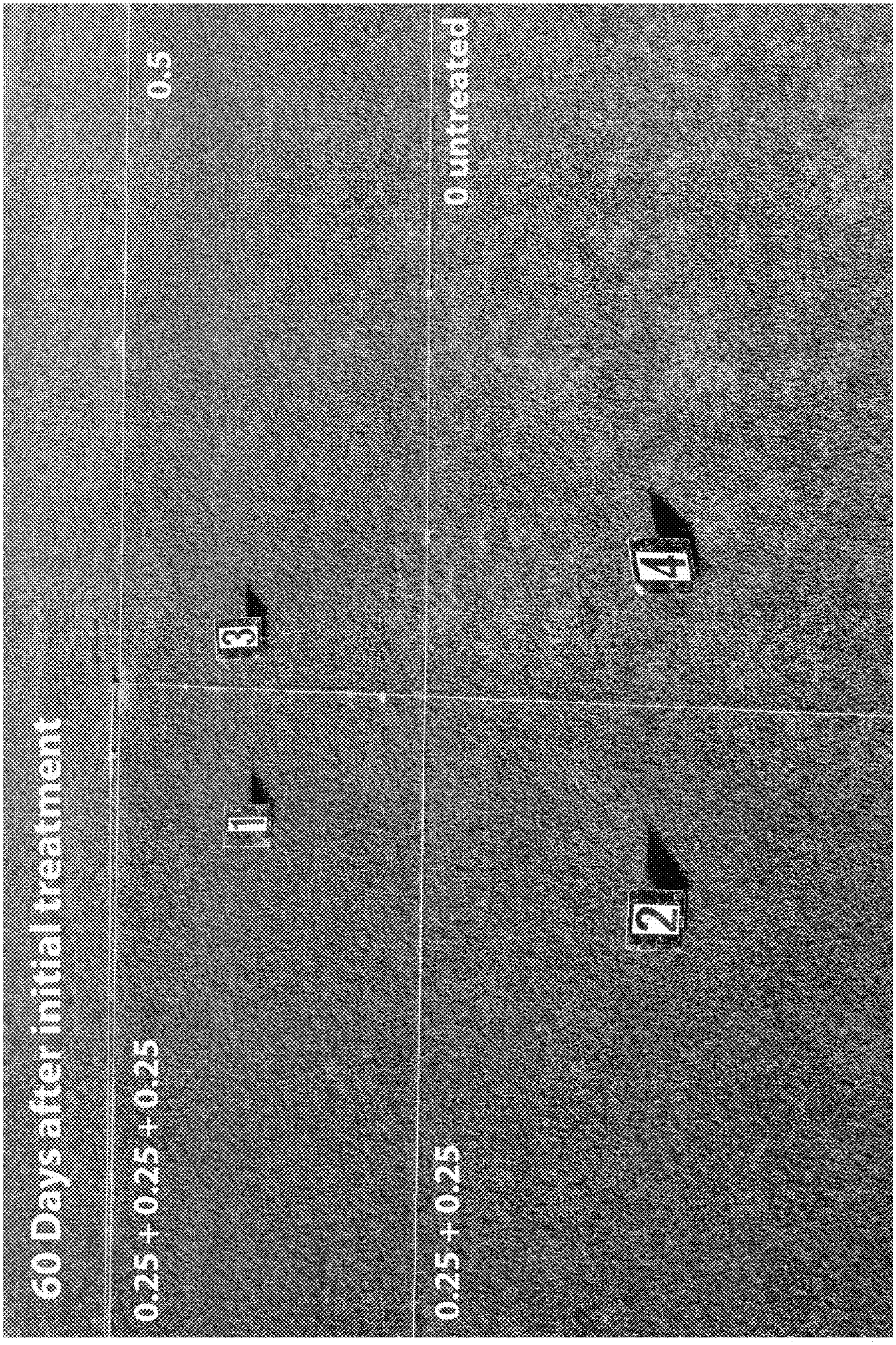
FIG. 6A is a photograph of a ryegrass turf test area that contains annual bluegrass (on a different property as FIG. 3A) after 60 days of treatment. The area was subdivided into four sections to compare the effect of annual bluegrass control with a single application, double, or triple applications of Simazine at varying application rates.
Figure 6B:
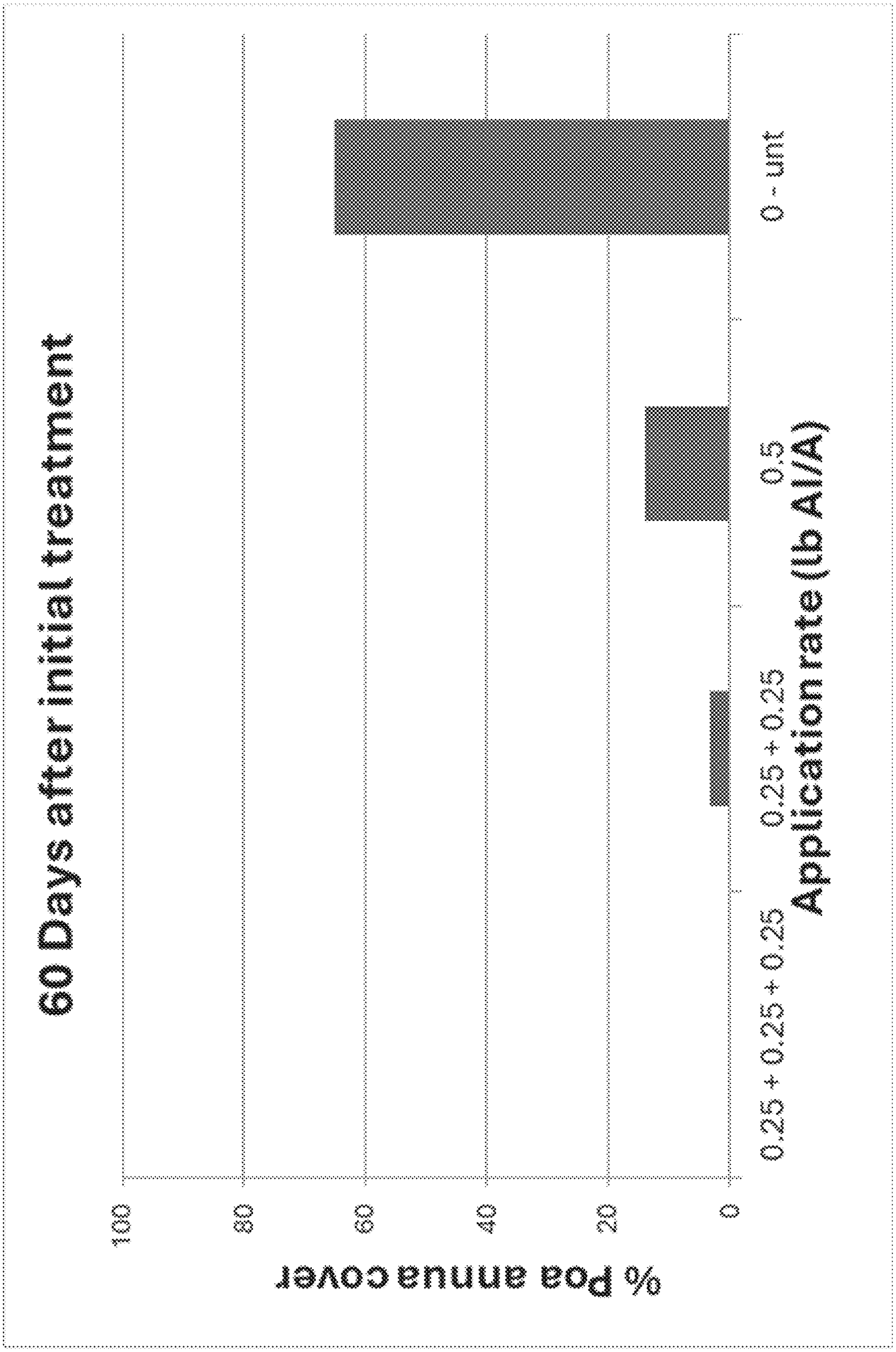
FIG. 6B depicts a graph quantifying percentage of annual bluegrass in the test area at 60 days after treatment.

FIG. 1A depicts a ryegrass/annual bluegrass turf test area that was subjected to four treatments. Initial treatments were made in December. Treatment area #1 received a low application rate (0.25 lb AI/A) of Simazine followed by a second low rate application one month later. Treatment area #2 received two medium rate (0.5 lb AI/A) applications on the same schedule as treatment area #1. Treatment area #3 received a single medium rate application. Treatment area #4 received no Simazine applications. The test area was evaluated 90 days after the first application as shown in FIG. 1A and the quantification data is presented in FIG. 1B. As is evident from FIG. 1B, during the 90 days of treatment where the daily high temperature was increasing, annual bluegrass started overtaking the turf (reducing ryegrass percentage without treatment FIG. 2A illustrates selective control of annual bluegrass in another experimental site with single application of Simazine at a higher application rate (1.0 lb AI/A) using the 4 L formulation. FIG. 2B represents a single application at 0.75 lb AI/A using the 90DF formulation. Accordingly, the effective dosage of Simazine does not change based on the formulation of Simazine. FIG. 3A compares single application of application rates of 0.25 lb AI/A, 0.5 lb AI/A, 0.75 lb AI/A, and 1.0 lb AI/A at 86 days after treatment. FIG. 3B quantifies the percentage of annual bluegrass coverage on the test turf at 79 days after treatment. Without any treatment, over 80% of the turf was covered in annual bluegrass, but a single application of the lowest application rate (0.25 lb AI/A) reduced annual bluegrass coverage to 50%. The highest application rate (1.0 lb AI/A) effectively removed visual presence of any annual bluegrass within the treated turf.

Thus, as illustrated above for the control of annual bluegrass infestation of ryegrass turf, in order to be safe and effective, application rates generally range between 0.1 and 1.0 lb AI/A. Higher application rates yield more effective control than lower rates. However, multiple applications of lower rates may provide greater safety to the ryegrass than a higher rate single application even though both may effectively control the annual bluegrass (FIGS. 4A-6B). Multiple applications of Simazine at lower rates reduce the risk of overdosing the desirable cool-season turfgrass due to application overlaps, which occur often during turf treatments. Although no photo documentation is provided herein, multiple applications at rates as low as 0.05 lbs AI/A have successfully controlled *Poa annua* in turf comprising cool-season turfgrasses.

Figure 7A:
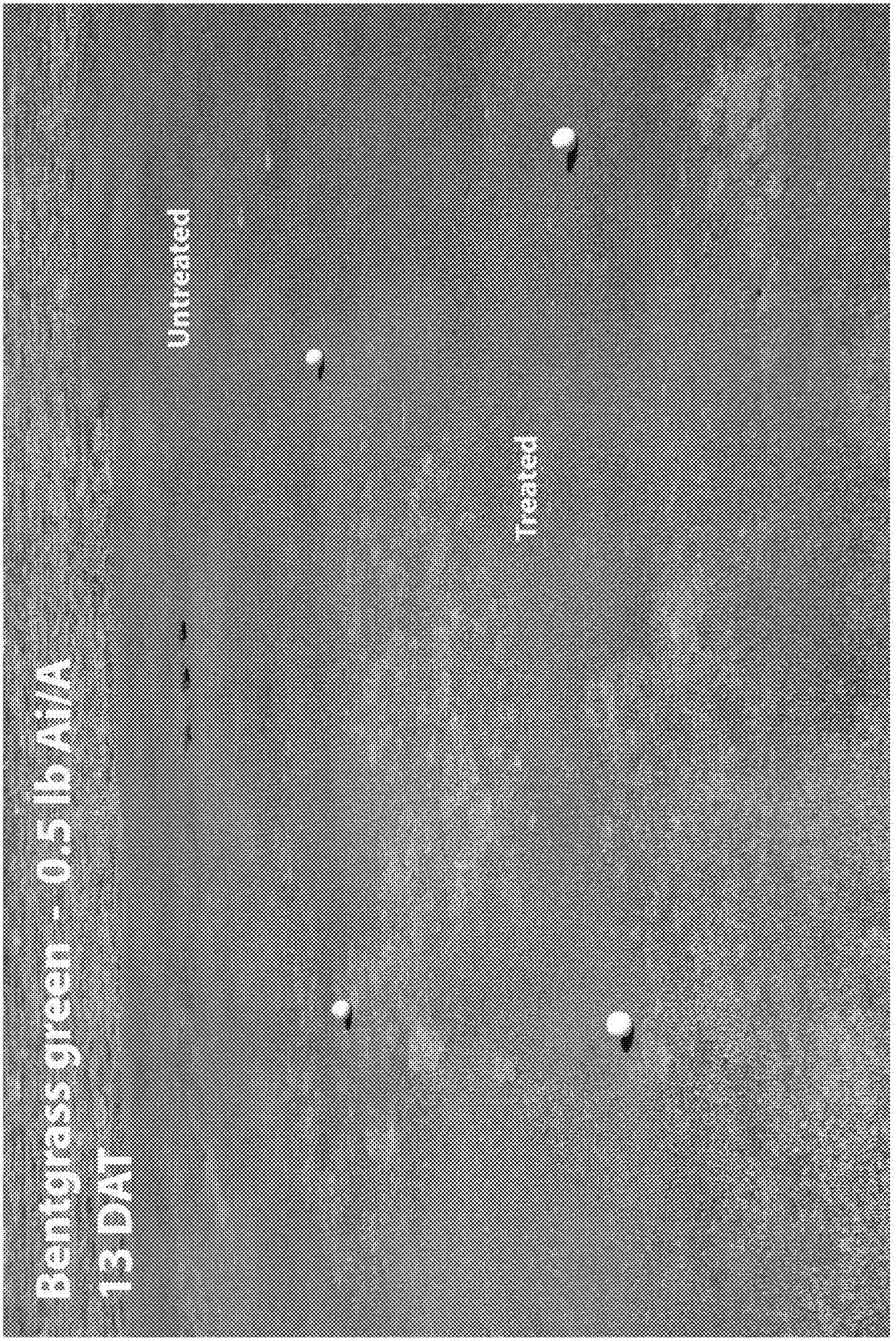
FIGS. 7A and 7B are photographs demonstrating that Simazine effectively controls *Poa annua* in bentgrass (*Agrostis* sp.) golf greens turf.
Figure 7B:
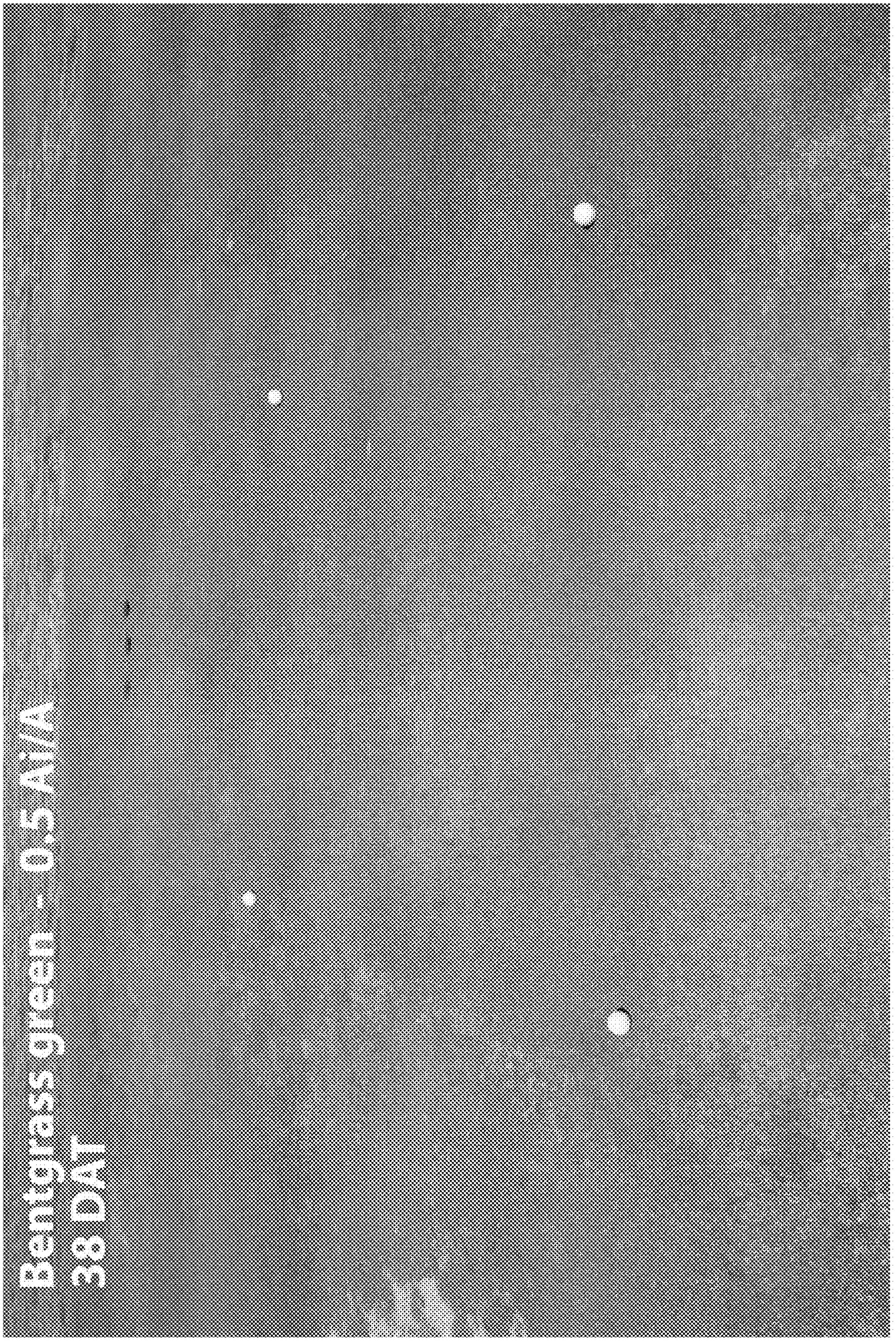

Bentgrass turfgrass species are more sensitive to Simazine application than ryegrass. Hence, in order to reduce the potential for bentgrass injury, lower application rates are appropriate. Appropriate application for annual bluegrass control in bentgrass turfgrass may range between 0.05 and 0.5 lb AI/A. As shown in FIGS. 7A and 7B, simple application of Simazine to turf comprising bentgrass at a rate of 0.5 lb AI/A effectively controlled annual bluegrass infestation. While there was still a large presence of annual bluegrass at 13 days after treatment, the patch of annual bluegrass is visibly ill (FIG. 7A). By 38 days after Simazine treatment, the coverage of the test area with annual bluegrass in the treated area was significantly reduced.

For the method of reducing formation of flowers and seedheads of annual bluegrass in a turf comprising a cool-season turfgrass species, the method comprises applying an effective dosage of Simazine to the turf. The effective dosage is a sub-lethal dosage of Simazine with respect to both cool-season turfgrass species and annual bluegrass in the turf.

If a turf comprising cool-season turfgrasses species is heavily infested with annual bluegrass, it may not be desirable to apply a dosage of Simazine that kills annual bluegrass, hence leaving bare soil. However, applying a sub-lethal dosage of Simazine in relation to annual bluegrass still improves the quality of the turf comprising cool-season turfgrasses. Using applications that are sub-lethal to annual bluegrass (at least in the near term), simazine treatment suppresses the production of annual bluegrass flowers and seedheads rendering the turf more desirable.

Figure 8A:
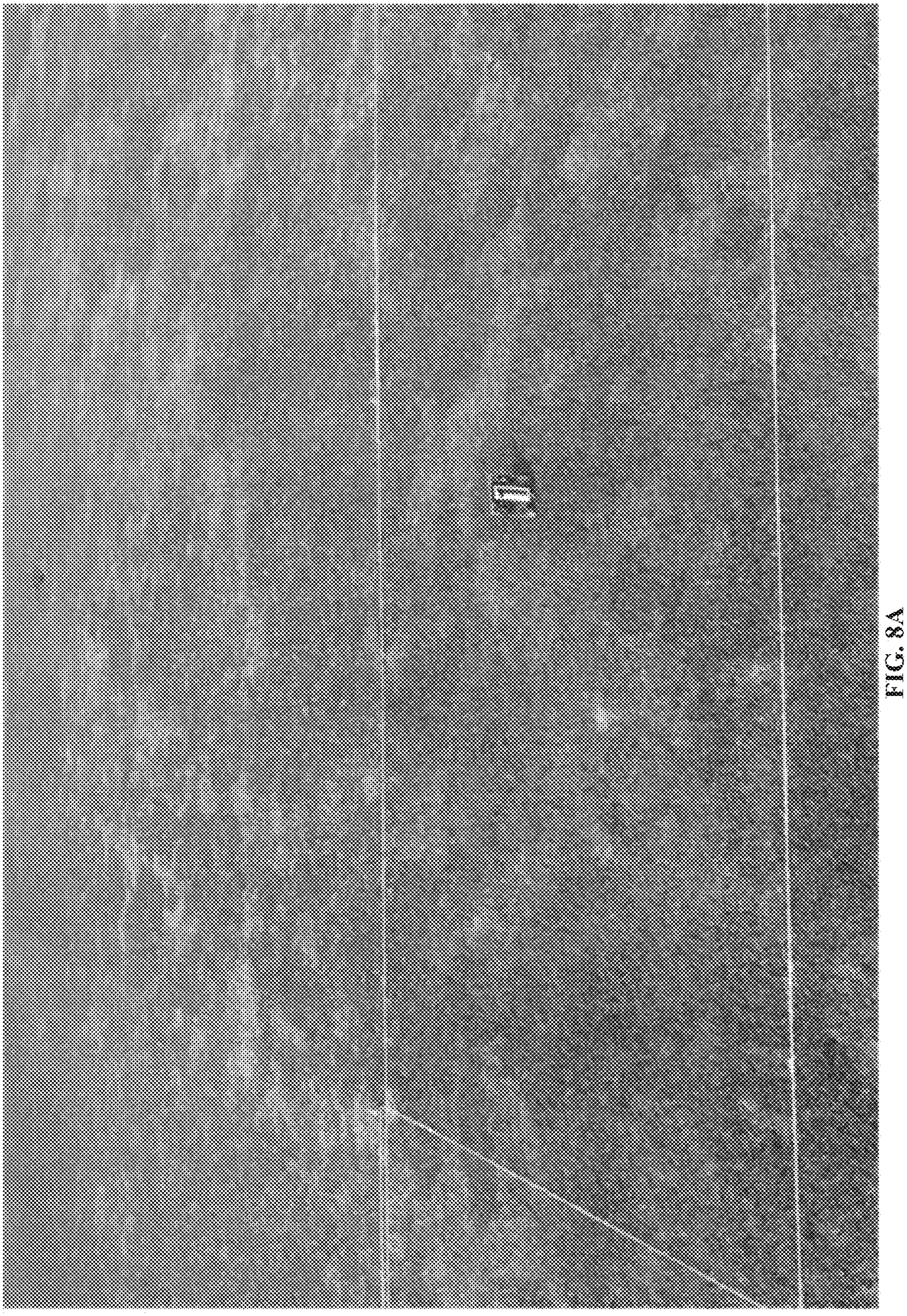
FIGS. 8A-8C are photographs demonstrating that a single application of Simazine treatment resulted in the test turf developing a darker green color, which is more aesthetically desirable and is the result of the deeper green color of ryegrass. Like the test turf shown in FIGS. 2A, 2B, and 3A, the treated ryegrass exhibits a deeper green color than the ryegrass outside the treated areas, in particular with higher application rates.
Figure 9A:
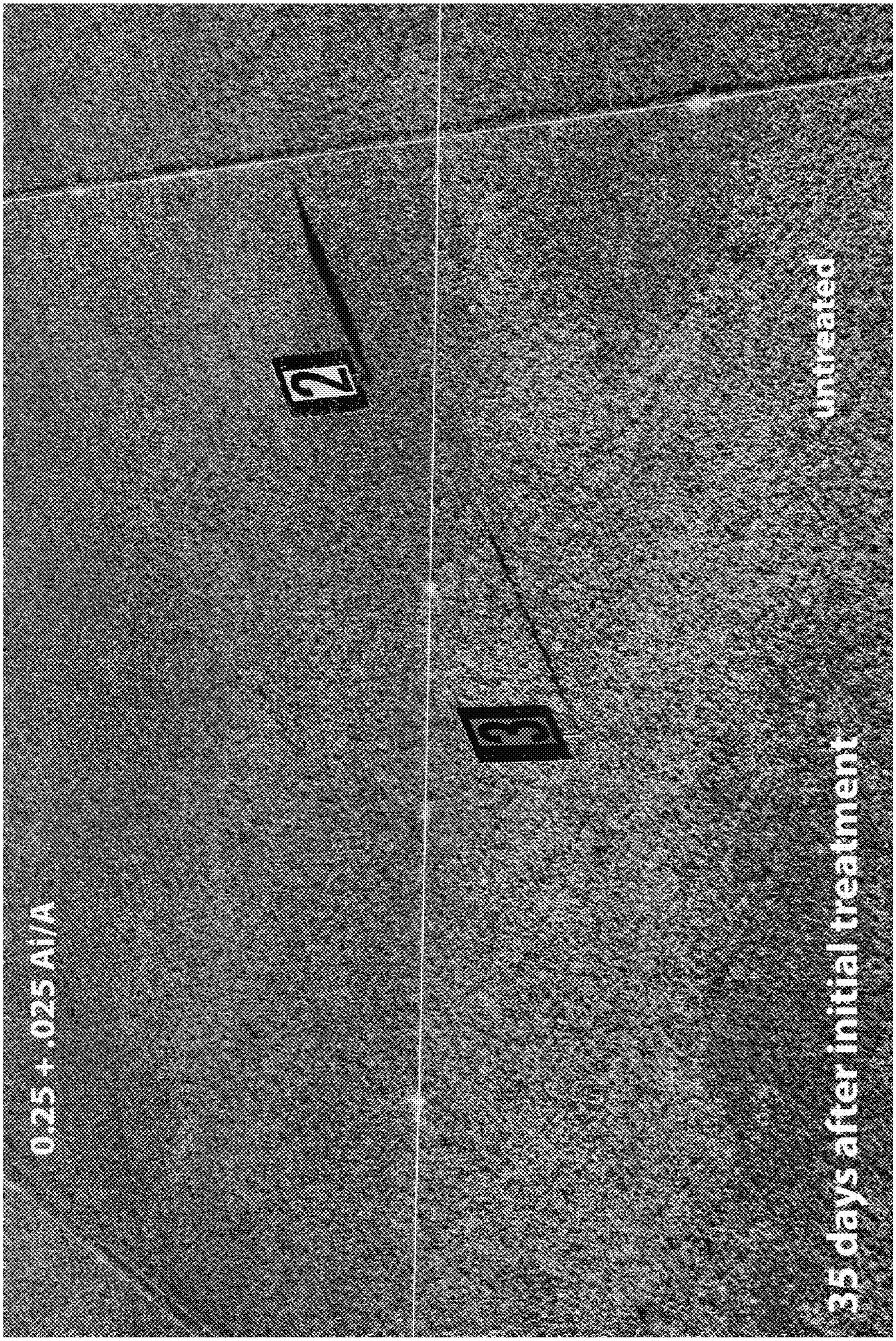
FIGS. 9A and 9B are photographs demonstrating that applying multiple sub-lethal dosage of Simazine in relation to *Poa annua* suppresses the production of *Poa annua* flowers and seedheads rendering the turf more visually desirable. The test turfs shown in FIGS. 9A and 9B are ryegrass turfs infested with *Poa annua* that received two applications of Simazine at a rate of 0.25 lb AI/A per application.
Figure 9B:
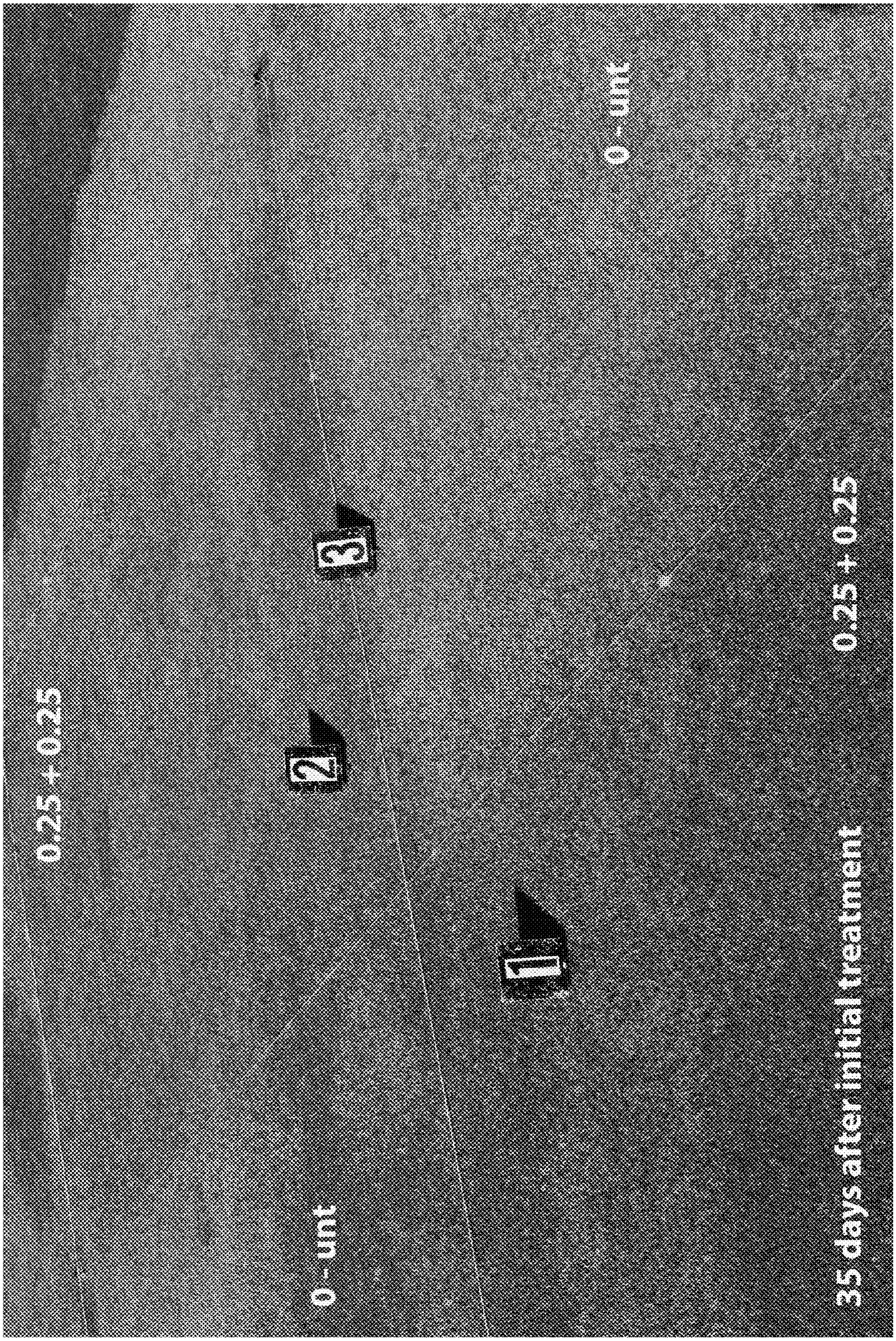

The #1 plot in FIG. 8A was treated with Simazine (0.25 lb AI/A). While only a portion of the annual bluegrass was killed, flowering and seedhead production was suppressed in the surviving annual bluegrass plants (lime green areas). The other areas were untreated and the annual bluegrass there produced prolific flowers and seedheads. FIGS. 9A and 9B show multiple applications made to ryegrass turf infested with *Poa annua*. The treatment did not kill the *Poa annua*; however, the formation of flowers and seedheads was greatly suppressed, thus improving the desirability of the turf.

Figure 12:
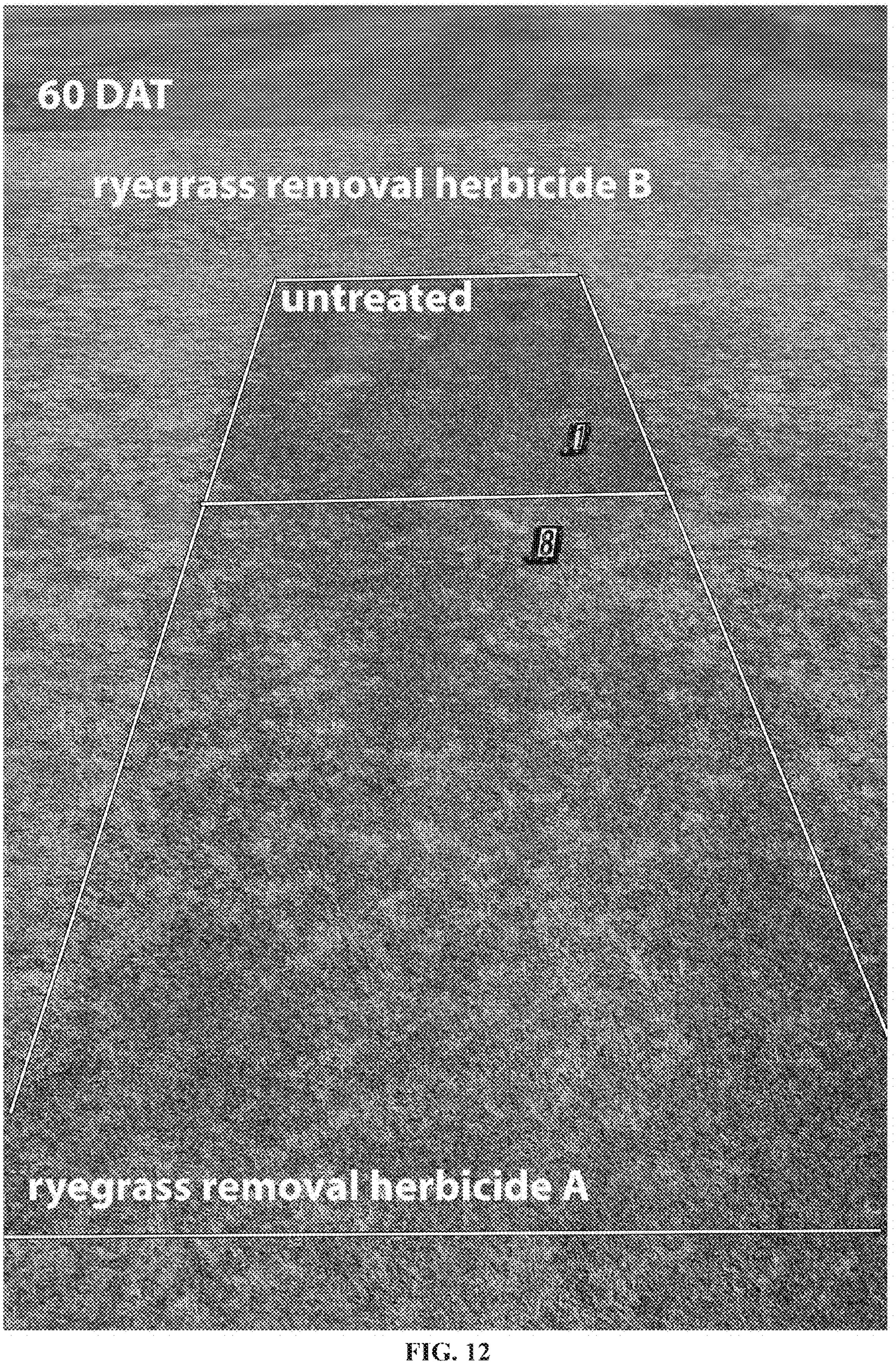
FIG. 12 is a photograph demonstrating that co-administering Simazine with other herbicides improves the results of the herbicidal treatment. Herbicides A and B were applied at low dosages to weaken the existing ryegrass turf which was infested with *Poa annua. Poa annua* is not sensitive to either A or B. As shown in the untreated section, *Poa annua* would otherwise proliferate during the herbicidal treatment at 60 days after treatment, but co-administration with Simazine prevents *Poa annua* proliferation during the herbicidal treatment.

Because annual bluegrass is not sensitive to certain herbicides used for weakening existing ryegrass, treatment with such herbicides may not be beneficial in removing the turf as the annual bluegrass would proliferate in the area. However, mixing Simazine with herbicides improves the results of the herbicidal treatments in turf removal. As shown in FIG. 12, herbicides A and B were applied at low dosages to weaken the existing ryegrass turf, which contained annual bluegrass infestation. Annual bluegrass is not sensitive to either herbicide. Hence, upon weakening the ryegrass, the annual bluegrass was able to proliferate. However, mixing Simazine with either herbicide allowed the herbicides to achieve the desired results without allowing annual bluegrass to proliferate.

2. Enhancing Appearance and Quality of Turf Comprising Cool-Season Turfgrasses

Simazine may be used to enhance color and quality of a cool-season turfgrass species that is not entirely dependent on controlling annual bluegrass infestation. This result is particularly desirable during period of temperature stress.

Figure 8B:
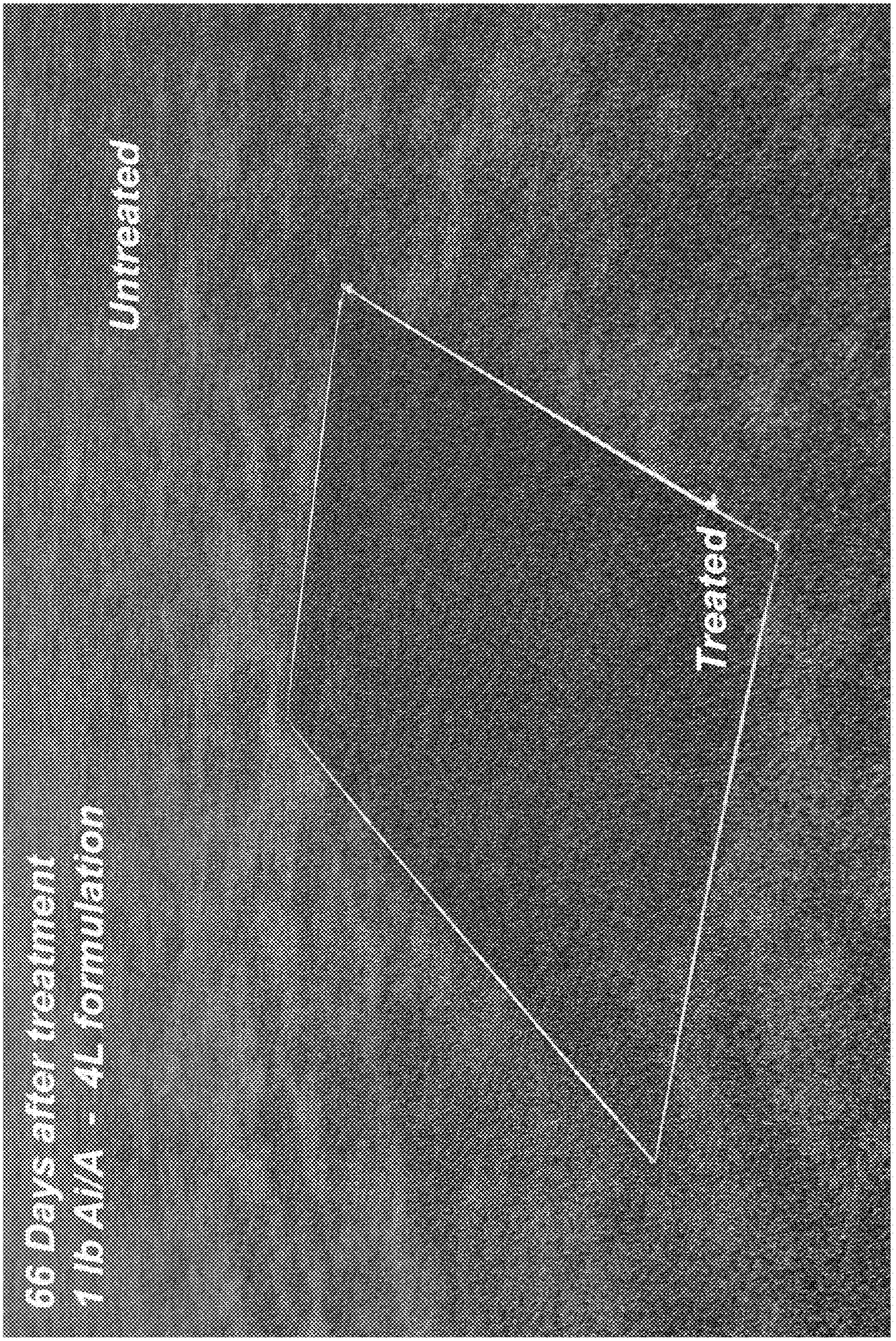
Figure 8C:
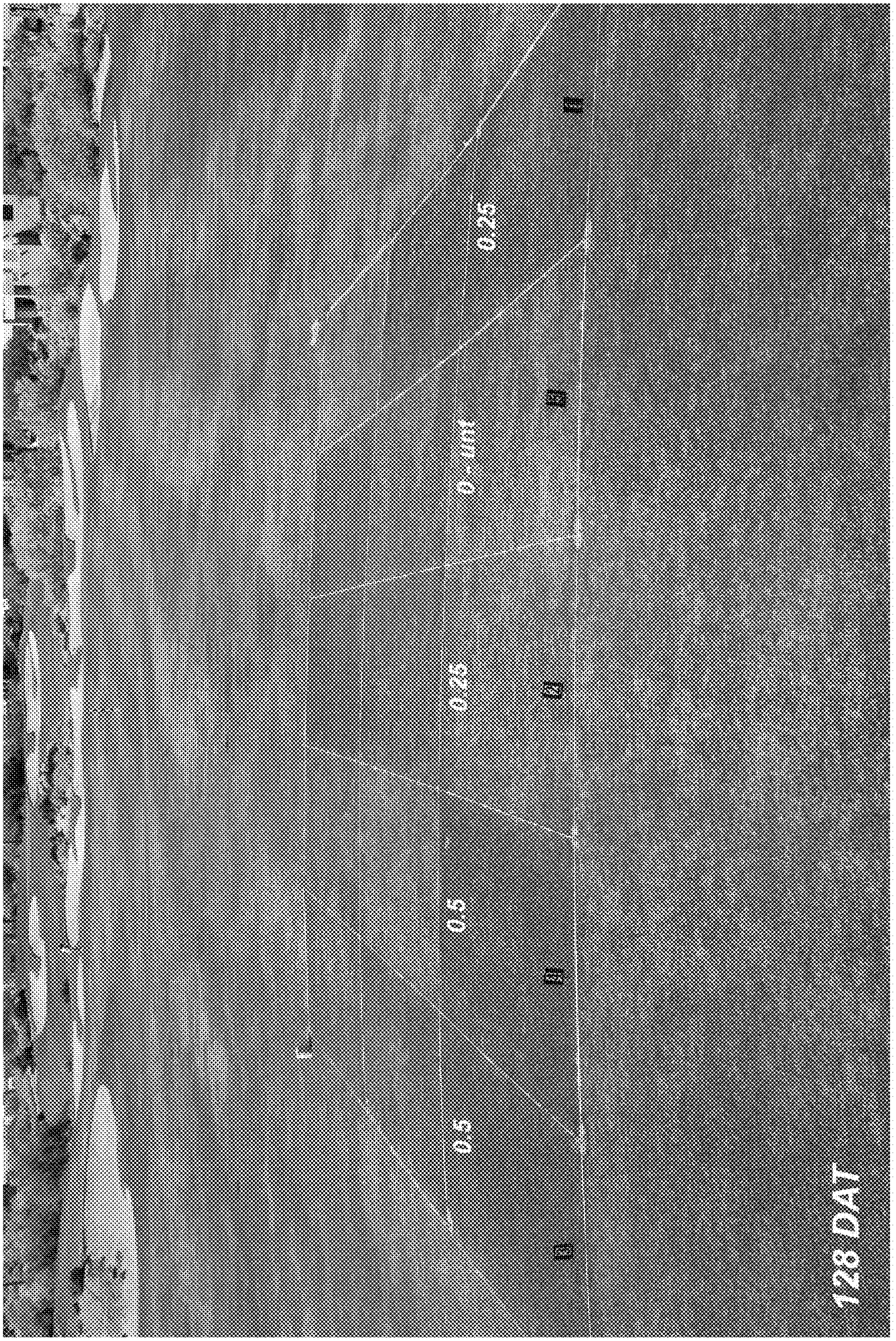

As can be visible in FIGS. 2A and 2B, the treated ryegrass exhibits a deeper green color than the ryegrass outside the treated areas. The same is illustrated in FIG. 3A at the higher simazine application rates. FIGS. 8B and 8C illustrated the deeper green color of ryegrass in the treated versus that in the untreated area.

Simazine can also be applied to turf comprising cool-season turfgrass species in specialized situations. For example, when converting from overseeded ryegrass turf to perennial bermudagrass in the spring season, sublethal doses of Sapphire herbicide (or other ryegrass-removal herbicides) are applied to cause the ryegrass to slowly fade away. However, the ryegrass-removal herbicide treatment degrades the color and quality of the ryegrass during this process. Inclusion of a sub-lethal Simazine dosage with the Sapphire treatment not only prevents the quality degradation of the turf but enhances the color and quality of the ryegrass turf throughout the process. In such embodiments, the sub-lethal dose of Simazine has an application rate of about 0.25 AI/A. Color enhancement of bentgrass turfgrass is accomplished with much lower rates comparatively. In other aspects, a method of enhancing color and quality of a turf including the cool-season turfgrass species comprises co-administering Simazine with Penoxsulam or other ryegrass-removal herbicides to the turf comprising the cool-season turfgrass species. In such implementations, a sub-lethal dosage application of Simazine in relation to the desirable cool-season turfgrass species is co-administered with Penoxsulam or other ryegrass-removal herbicides.

Figure 11A:
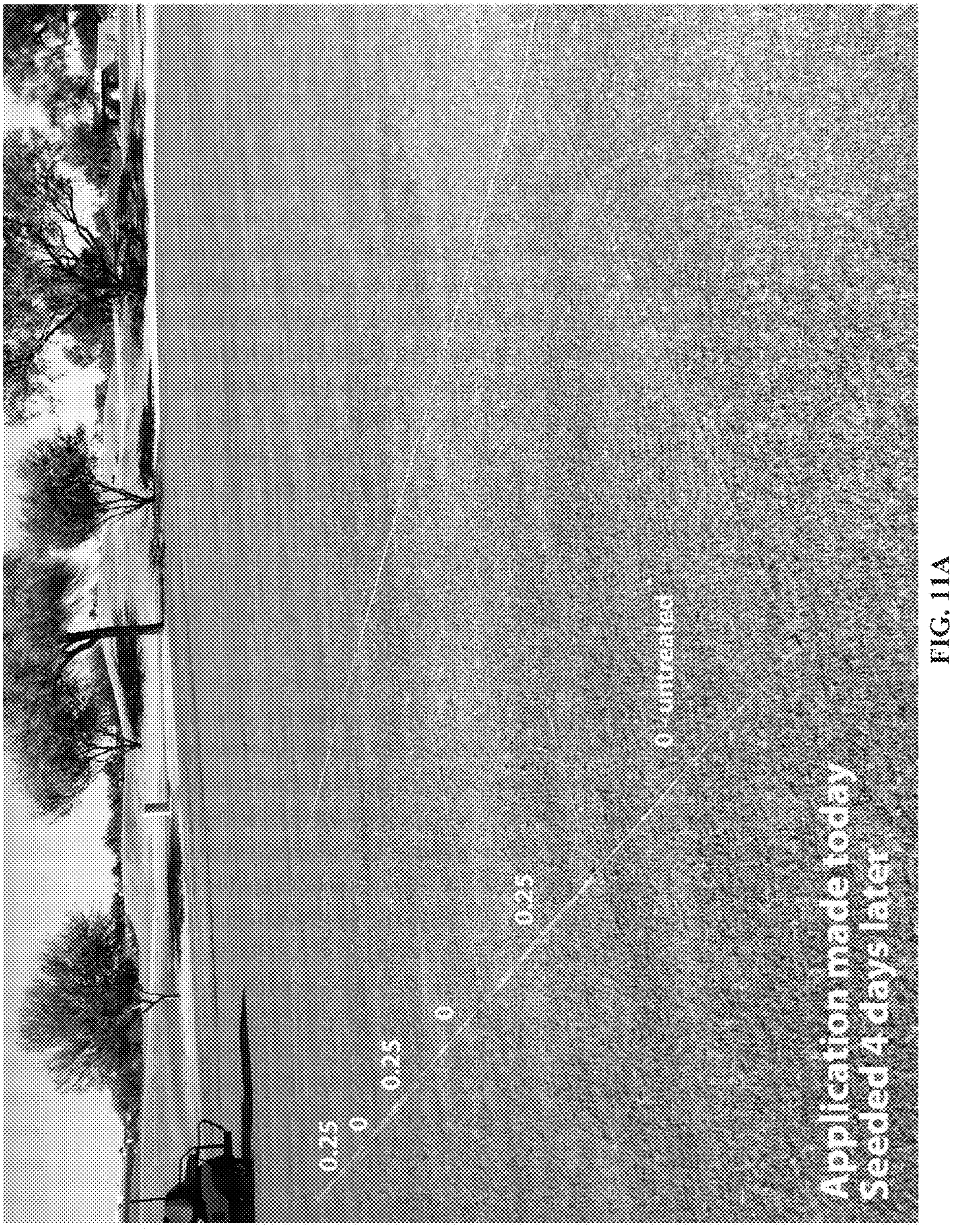
FIGS. 11A and 11B are photographs demonstrating that application of Simazine is not injurious to desired cool-season turfgrasses when applied prior to planting seed.
Figure 11B:
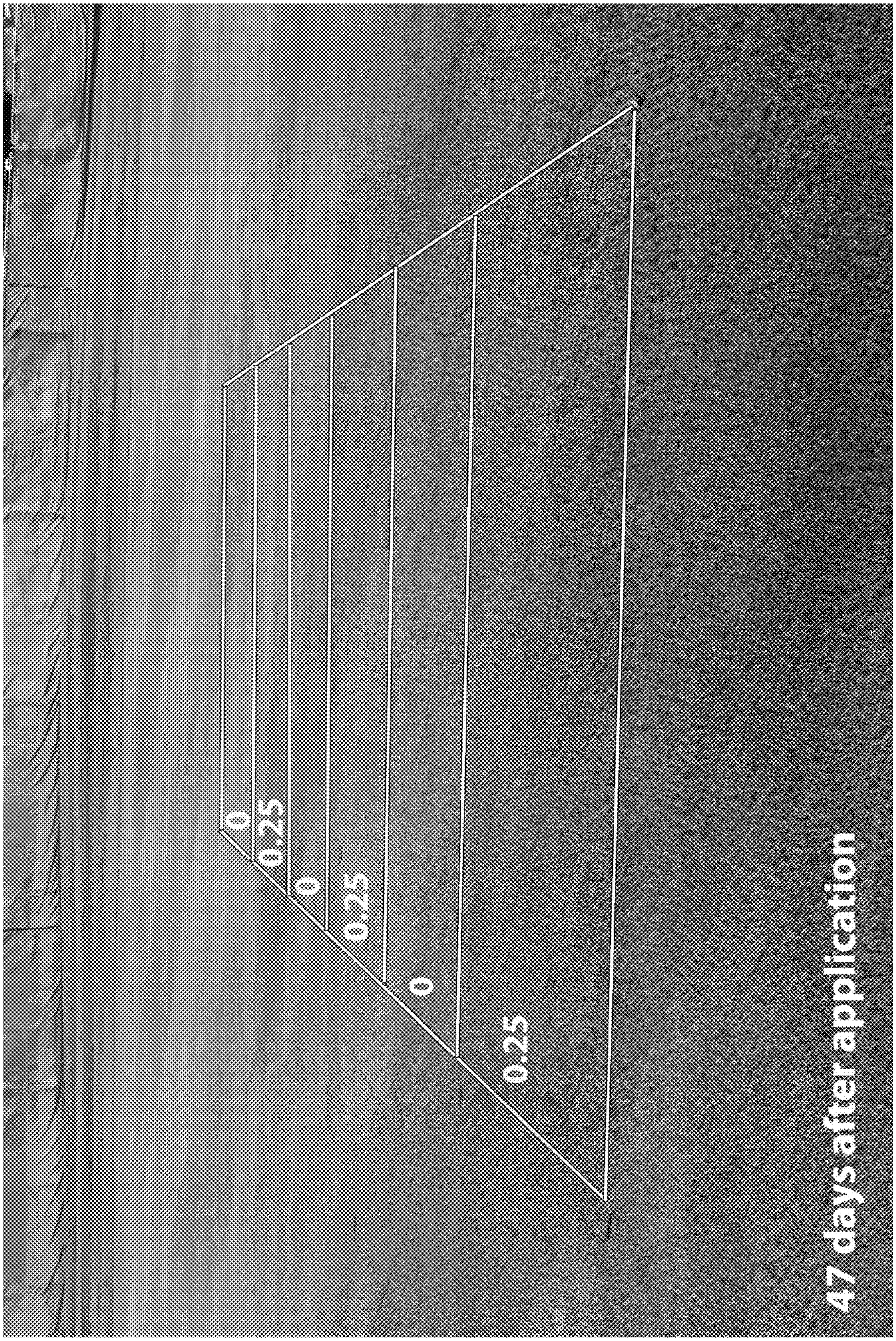

Simazine may also be applied during the transition of a turf from warm-season turfgrass species to cool-season turfgrass species. Simazine is not injurious to desired cool-season turfgrasses when applied prior to planting seed. FIG. 11A show soon-to-be-dormant bermudagrass turf treated with simazine four days prior to planting ryegrass into the turf. As shown in FIG. 11B, the whole treated area is covered with healthy young ryegrass at 43 days after seeding with ryegrass. Thus, Simazine treatments did not affect the young ryegrass.

Accordingly, a composition comprising Simazine and a ryegrass-removal herbicide is disclosed. The amount of the ryegrass-removal herbicide is a manufacturer-recommended amount for removing ryegrass. In some aspects, the weight ratio of the Simazine and the ryegrass-removal herbicide in the composition is 1:1.

3. Control of Seashore *Paspalum* in Warm-Season Turfgrasses

It was also discovered that Simazine can selectively control seashore *Paspalum* (*Paspalum vaginatum*) in a turf comprising bermudagrass. The method comprises applying an effective dosage of Simazine to the turf.

Figure 13:
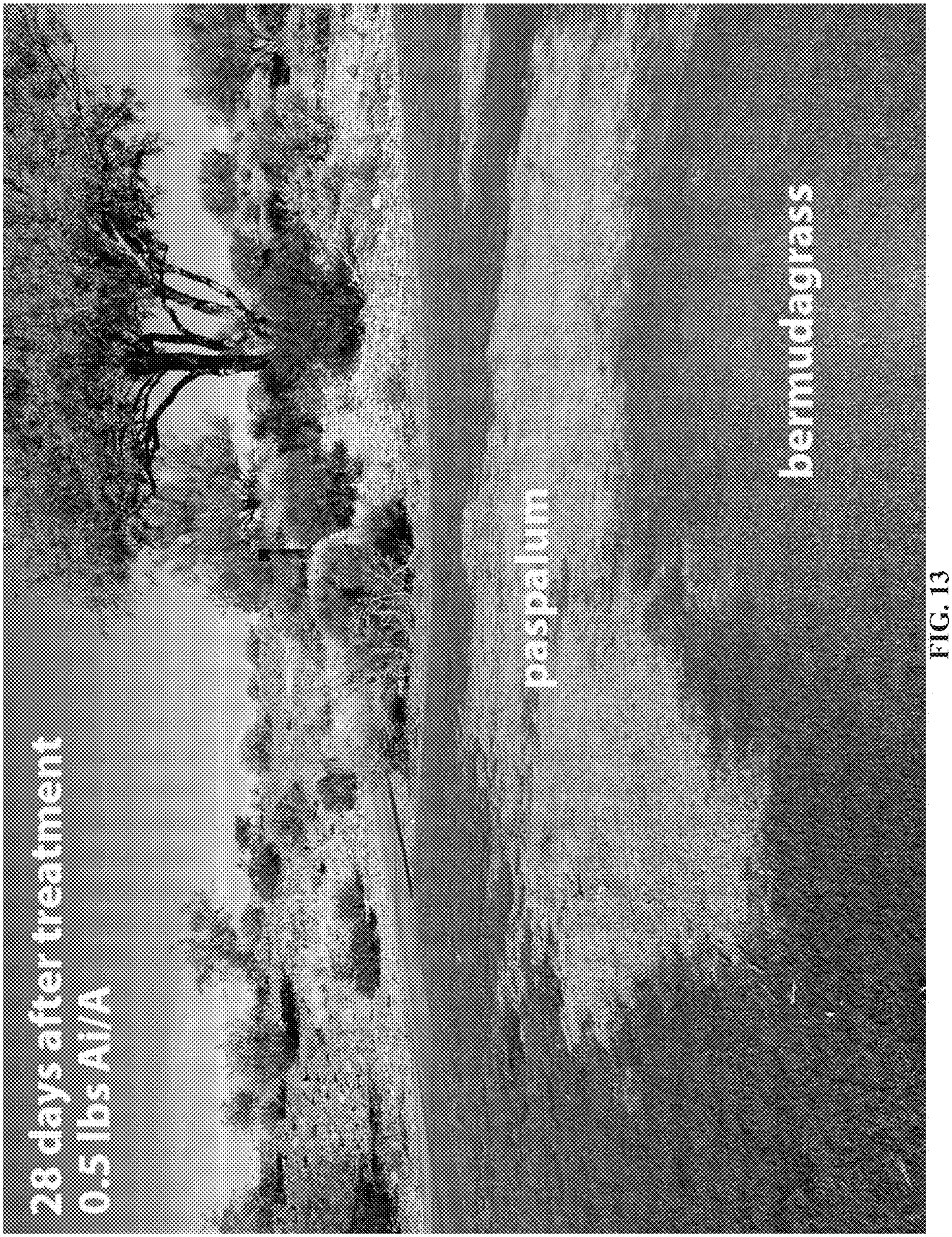
FIG. 13 is a photograph demonstrating that Simazine can be used to selectively control seashore *Paspalum* in bermudagrass turf. With a single application of Simazine at a rate of 0.5 lb AI/A, seashore *Paspalum* was eradicated while not damaging bermudagrass.

Bermudagrass and seashore *Paspalum* (*Paspalum vaginatum*) are both warm-season turfgrasses. However, when one species is desired, often the other species is found to contaminate the desired species. When seashore *Paspalum* contaminates bermudagrass, the result is undesirable. It was discovered that Simazine may be used to selectively remove the seashore *Paspalum* because bermudagrass is much more tolerant of Simazine than is seashore *Paspalum*. FIG. 13 illustrates the use of Simazine to eradicate seashore *Paspalum* while not damaging bermudagrass (application rate 0.5 lb AI/A).

Other implementations are also contemplated and possible. These listed here, and many others, will become readily apparent from this disclosure. Further implementations are within the Claims.

I claim:

1. A method of using Simazine for controlling an infestation of annual bluegrass (*Poa annua*) in a turf comprising a cool-season turfgrass species, the method comprising applying an effective dosage of Simazine to the turf, wherein the effective dosage of Simazine is an independently effective dose for controlling the infestation of annual bluegrass (*Poa annua*) regardless of whether any other herbicide also is applied to the turf, and wherein the effective dose of Simazine does not unacceptably damage the cool-season turfgrass species.

2. The method of claim 1, wherein the effective dosage of Simazine suppresses growth of annual bluegrass in a turf comprising a cool-season turfgrass species.

3. The method of claim 1, wherein the effective dosage of Simazine is about 0.01 lb AI/A to about 1.0 lb AI/A.

4. The method of claim 3, wherein the effective dosage of Simazine is about 0.5 lb AI/A to about 1.0 lb AI/A.

5. The method of claim 4, wherein Simazine is applied one time.

6. The method of claim 4, wherein Simazine is applied two times, each application separated by about three weeks.

7. The method of claim 4, wherein Simazine is applied no more than two times, each application separated by one week to about four weeks.

8. The method of claim 3, wherein the effective dosage of Simazine is about 0.01 lb AI/A to about 0.25 lb AI/A.

9. The method of claim 8, wherein the effective dosage of Simazine is about 0.05 lb AI/A-about 0.25 lb AI/A.

10. The method of claim 8, wherein the effective dosage of Simazine is applied at least two times, each application is separated by at least one week.

11. The method of claim 10, wherein each application is separated by about one week to about four weeks.

12. The method of claim 10, wherein each application is separated by about three weeks.

13. The method of claim 8, wherein Simazine is applied three times, each application is separated by at least one week.

14. The method of claim 1, wherein the cool-season turfgrass species comprises at least one species selected from the group consisting of: rye, bentgrass, and fescue.

15. The method of claim 14, wherein the cool-season turfgrass species is rye, and the effective dosage of Simazine is about 0.1 lb AI/A to about 1.0 lb AI/A.

16. The method of claim 14, wherein the cool-season turfgrass species is bentgrass, and the effective dosage of Simazine is about 0.05 lb AI/A.

17. A method of reducing formation of flowers and seedheads by annual bluegrass (*Poa annua*), the method comprising applying an effective dosage of Simazine to the annual bluegrass, wherein the effective dosage of Simazine is a sub-lethal dosage of Simazine in relation to annual bluegrass, and wherein the effective dosage of Simazine is independently effective for reducing formation of flowers and seedheads by annual bluegrass regardless of whether any other herbicide also is applied to the annual bluegrass.

18. The method of claim 17, wherein the annual bluegrass is grown in a turf comprising cool-season turfgrass species, the effective dosage of Simazine is a sub-lethal dosage of Simazine in relation to both annual bluegrass and the cool-season turfgrass species.

19. The method of claim 18, wherein the cool-season turfgrass species comprises at least one species selected from the group consisting of: rye, bentgrass, and fescue.

20. The method of claim 17, wherein the effective dosage of Simazine is about 0.25 lb AI/A.

21. A method of enhancing color and quality of a turf comprising the cool-season turfgrass species, the method comprising applying an effective dosage of Simazine to the turf, wherein the effective dosage of Simazine is a sub-lethal dosage of Simazine in relation to the cool-season turfgrass species, and wherein the effective dosage of Simazine is independently effective regardless of whether any other herbicide is also applied to the turf.

22. The method of claim 21, wherein the cool-season turfgrass species is selected from rye, bentgrass, or fescue.

23. The method of claim 21, further comprises co-administering an herbicide with the effective dosage of Simazine.

24. The method of claim 23, wherein the herbicide is for killing cool-season turfgrass species.

25. The method of claim 23, wherein the herbicide is Penoxsulam.

26. The method of claim 25, wherein the effective dosage of Simazine is about 0.25 lb AI/A.

27. A composition comprising:

Simazine; and a ryegrass-removal herbicide, wherein the amount of the ryegrass-removal herbicide is a manufacturer-recommended amount for removing ryegrass, and wherein the Simazine is present at an independently-effective amount for controlling an infestation of annual bluegrass (*Poa annua*) regardless of whether any other herbicide that may be present also is effective for controlling annual bluegrass (*Poa annua*).

28. The composition of claim 27, wherein the ryegrass-removal herbicide is Penoxsulam, and the weight ratio of the Simazine and the ryegrass-removal herbicide is 1:1.

29. A method of using Simazine for controlling an infestation of annual bluegrass (*Poa annua*) in a turf comprising a cool-season turfgrass species, the method consisting essentially of applying an effective dosage of Simazine to the turf, wherein the effective dosage of Simazine is an independently effective dose for controlling the infestation of annual bluegrass (*Poa annua*) regardless of whether any other herbicide also is applied to the turf, and wherein the effective dose of Simazine does not unacceptably damage the cool-season turfgrass species.

* * * * *